US012725634B2

(12) United States Patent
Yamaga et al.

(10) Patent No.: US 12,725,634 B2
(45) Date of Patent: Sep. 1, 2026

(54) MAGNETIC RECORDING MEDIUM

(71) Applicant: SONY GROUP CORPORATION, Tokyo (JP)

(72) Inventors: Minoru Yamaga, Tokyo (JP); Sogo Oikawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 19/150,141

(22) PCT Filed: Jan. 15, 2024

(86) PCT No.: PCT/JP2024/000719
§ 371 (c)(1),
(2) Date: Jul. 22, 2025

(87) PCT Pub. No.: WO2024/161957
PCT Pub. Date: Aug. 8, 2024

(65) Prior Publication Data

US 2026/0162677 A1 Jun. 11, 2026

(30) Foreign Application Priority Data

Jan. 31, 2023 (JP) ................................ 2023-013302

(51) Int. Cl.
*G11B 5/70* (2006.01)
*G11B 5/008* (2006.01)
*G11B 5/708* (2006.01)

(52) U.S. Cl.
CPC .......... *G11B 5/708* (2013.01); *G11B 5/00813* (2013.01)

(58) Field of Classification Search
CPC ........... G11B 27/36; G11B 5/00; G11B 27/19; G11B 20/12; G11B 20/0013;
(Continued)

(56) References Cited

U.S. PATENT DOCUMENTS

2019/0378540 A1* 12/2019 Sekiguchi ............. C23C 14/545

FOREIGN PATENT DOCUMENTS

JP 2000-090431 A 3/2000
JP 2000-155935 A 6/2000
(Continued)

OTHER PUBLICATIONS

International Search Report and Written Opinion of PCT Application No. PCT/JP2024/000719, issued on Feb. 13, 2024, 08 pages of ISRWO.

*Primary Examiner* — Nabil Z Hindi
(74) *Attorney, Agent, or Firm* — CHIP LAW GROUP

(57) ABSTRACT

A main object of the present technology is to improve reliability and resolution of a magnetic recording tape by controlling distribution of the binder in the underlayer and a magnetic surface.

The present technology provides a magnetic recording medium including: a magnetic layer; an underlayer; and a base layer in this order, in which the underlayer contains a chlorine-containing binder, and in the underlayer, a part having a chlorine count equal to or more than a threshold described below has a thickness of 130 nm or less, and a core portion level difference Rk is 5.5 nm or less and an average thickness of the underlayer is 1100 nm or less in a bearing curve created on the basis of height data of a magnetic layer side surface acquired using an atomic force microscope.

[Threshold]=[an average chlorine count in the underlayer]+6×[a standard deviation determined in calculation of the average chlorine count].

15 Claims, 11 Drawing Sheets

(58) Field of Classification Search
CPC . G11B 15/087; G11B 5/5928; G11B 5/70678; G11B 5/71; G11B 5/714; G11B 5/7022; G11B 5/733; G11B 5/7358; G11B 5/78
USPC ........................................................ 360/48
See application file for complete search history.

(56) References Cited

FOREIGN PATENT DOCUMENTS

| | | | |
|---|---|---|---|
| JP | 2001-273623 | A | 10/2001 |
| JP | 2002-100021 | A | 4/2002 |
| JP | 2002-279619 | A | 9/2002 |
| JP | 2007-265547 | A | 10/2007 |
| WO | 2022/209935 | A1 | 10/2022 |

* cited by examiner

| Data number | X COORDINATE | Y COORDINATE |
|---|---|---|
| | AREA RATIO [%] | HEIGHT [nm] |
| 1 | 0.0004 | 30.332 |
| 2 | 0.0008 | 29.799 |
| 3 | 0.0011 | 29.152 |
| 4 | 0.0015 | 26.169 |
| 5 | 0.0019 | 25.424 |
| ⋮ | ⋮ | ⋮ |

Figure 8:
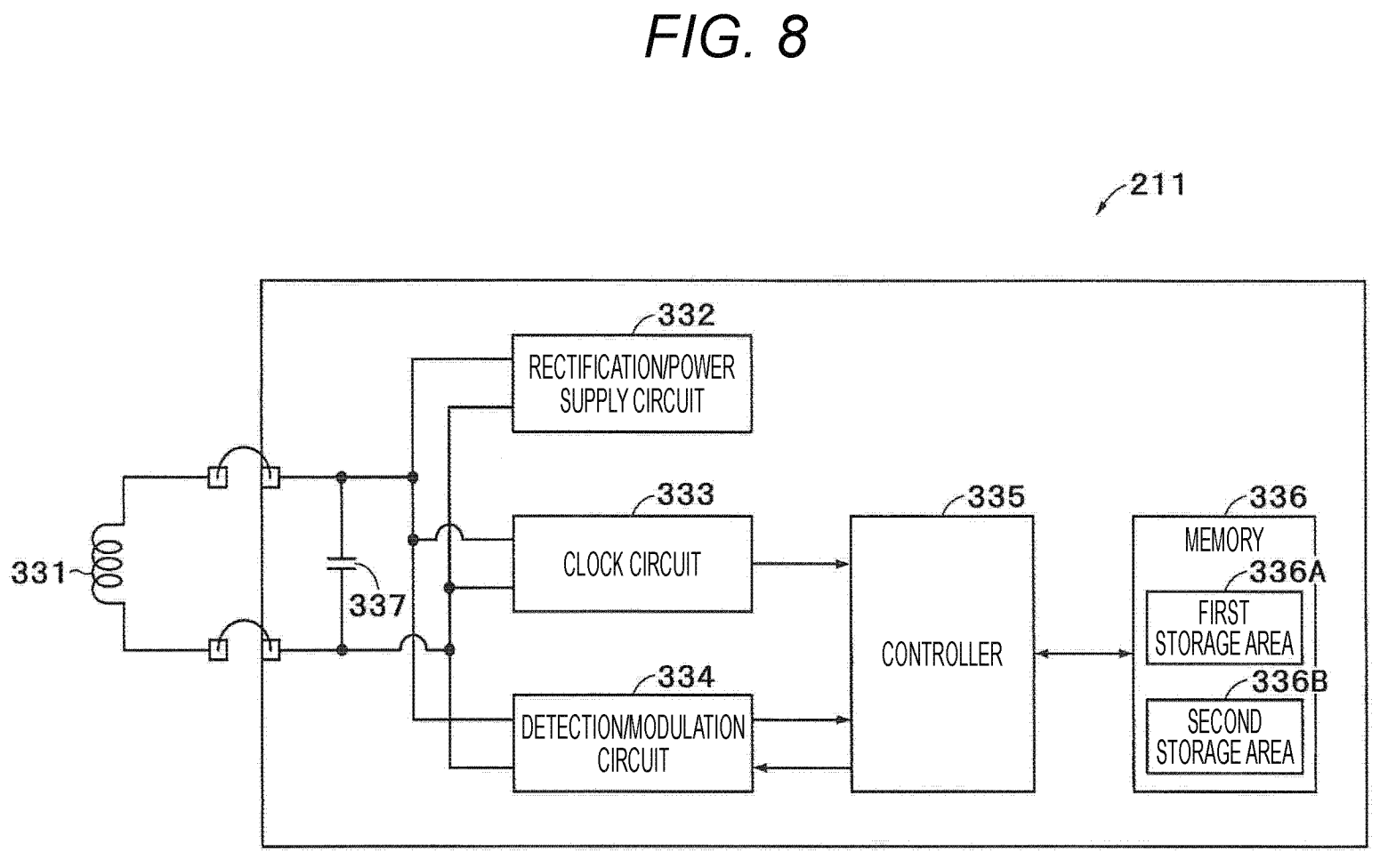

336 MEMORY

336A FIRST STORAGE AREA

336B SECOND STORAGE AREA

335 CONTROLLER

332 RECTIFICATION/POWER SUPPLY CIRCUIT

333 CLOCK CIRCUIT

334 DETECTION/MODULATION CIRCUIT

337

331

MAGNETIC RECORDING MEDIUM

CROSS REFERENCE TO RELATED APPLICATIONS

This application is a U.S. National Phase of International Patent Application No. PCT/JP2024/000719 filed on Jan. 15, 2024, which claims priority benefit of Japanese Patent Application No. JP 2023-013302 filed in the Japan Patent Office on Jan. 31, 2023. Each of the above-referenced applications is hereby incorporated herein by reference in its entirety.

TECHNICAL FIELD

The present technology relates to a magnetic recording medium.

BACKGROUND ART

The amount of data collected and stored has been greatly increased, for example, with the development of IoT, big data, artificial intelligence, and the like. A magnetic recording medium is often used as a medium for recording a large amount of data.

Various technologies have been proposed for a magnetic recording medium. For example, Patent Document 1 below discloses a magnetic recording medium including a magnetic layer having a thickness of 0.3 μm or less on one or both of surfaces of a non-magnetic support body, the magnetic layer containing at least an iron atom-containing magnetic powder and a binder, in which S(Fe) representing an average iron element content in a layer closer to the surface than the center of the magnetic layer and D(Fe) representing an average iron element content in a layer deeper than the center of the magnetic layer satisfy S(Fe)/D(Fe)≥1.1.

Furthermore, Patent Document 2 below discloses a magnetic recording medium including a magnetic layer formed on a non-magnetic support body by applying a magnetic coating material containing at least a magnetic powder and a binder, in which the magnetic layer includes different constituent elements in a depth direction of the magnetic layer, a content ratio of carbon included in the binder to elements included in the magnetic powder in a surface layer of the magnetic layer is 90 [vol %] or more, and a content ratio of carbon included in the binder to elements included in the magnetic powder at a depth of 50 Å or more from a surface of the magnetic layer is 70 [vol %] or less.

CITATION LIST

Patent Document

Patent Document 1: Japanese Patent Application Laid-Open No. 2002-279619

Patent Document 2: Japanese Patent Application Laid-Open No. 2002-100021

SUMMARY OF THE INVENTION

Problems to be Solved by the Invention

An object of the present technology is to provide a magnetic recording tape exhibiting high reliability and high resolution.

Solutions to Problems

The present technology provides a magnetic recording medium including:

a magnetic layer; an underlayer; and a base layer in this order, in which the underlayer contains a chlorine-containing binder, and in the underlayer, a part having a chlorine count equal to or more than a threshold described below has a thickness of 130 nm or less, and a core portion level difference Rk is 5.5 nm or less and an average thickness of the underlayer is 1100 nm or less in a bearing curve created on the basis of height data of a magnetic layer side surface acquired using an atomic force microscope.

[Threshold]=[an average chlorine count in the underlayer]+6×[a standard deviation determined in calculation of the average chlorine count]

The part having a chlorine count equal to or more than the threshold may be present in a side close to the base layer in the underlayer.

The total thickness of the magnetic layer and the underlayer may be 1000 nm or less.

The magnetic layer may have a thickness of 80 nm or less.

The underlayer may contain a non-magnetic powder.

The underlayer may contain a lubricant.

The magnetic recording medium may have an average thickness $t_T$ of 5.5 μm or less.

The magnetic layer may contain a magnetic powder.

The magnetic powder may contain hexagonal ferrite, ε-iron oxide, or Co-containing spinel ferrite.

The core portion level difference Rk may be 5.0 nm or less.

The height of the bearing curve at an area ratio of 10.00% may be 2.80 nm or less.

Furthermore, the present technology also provides a magnetic recording medium including:

a magnetic layer; an underlayer; and a base layer in this order, in which the underlayer contains a chlorine-containing binder, and in the underlayer, a part having a chlorine count equal to or more than a threshold described below has a thickness of 12% or less of a thickness of the underlayer, and a core portion level difference Rk is 5.5 nm or less and an average thickness of the underlayer is 1100 nm or less in a bearing curve created on the basis of height data of a magnetic layer side surface acquired using an atomic force microscope.

[Threshold]=[an average chlorine count in the underlayer]+6×[a standard deviation determined in calculation of the average chlorine count]

Furthermore, the present technology also provides a magnetic recording cartridge including the magnetic recording medium, the magnetic recording medium accommodated in a case in a state of being wound around a reel.

Furthermore, the present technology also provides a magnetic recording cartridge including:

the magnetic recording medium;

a communication unit that communicates with a recording and reproducing apparatus;

a storage unit; and a control unit that stores information received from the recording and reproducing apparatus via the communication unit in the storage unit, and reads the information from the storage unit in response to a request from the recording and reproducing apparatus, and transmits the information to the recording and reproducing apparatus via the communication unit, in which the information includes adjustment information for adjusting a tension applied to the magnetic recording medium in a longitudinal direction.

The base layer may contain a polyester-based material or a polyether ether ketone-based material.

BRIEF DESCRIPTION OF DRAWINGS

FIG. 8 is a block diagram illustrating an example of a configuration of a cartridge memory.

MODE FOR CARRYING OUT THE INVENTION

Figure 1:
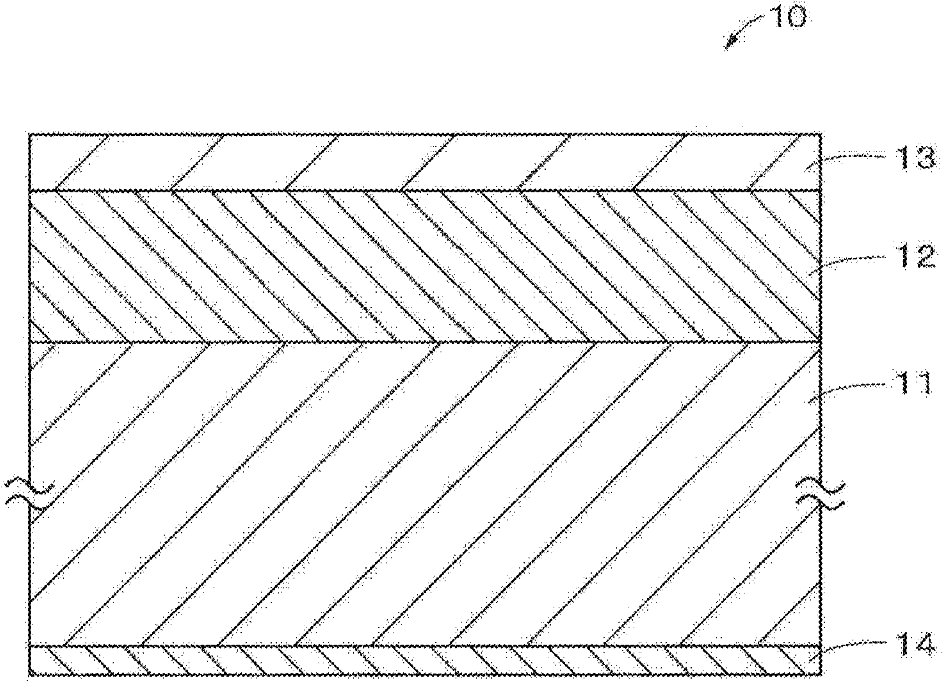
FIG. 1 is a cross-sectional view illustrating a configuration of a magnetic recording medium according to a first embodiment.

Hereinafter, preferred embodiments for implementing the present technology will be described. Note that embodiments described below illustrate representative embodiments of the present technology, and the scope of the present technology is not limited only to these embodiments.

The present technology will be described in the following order.

1. Description of Present Technology
2. First Embodiment
(1) Configuration of Magnetic Recording Medium
(2) Description of Each Layer
(3) Physical Properties and Structure
(4) Method of Manufacturing Magnetic Recording Medium
(5) Recording and Reproducing Apparatus
(6) Modified Examples
3. Second Embodiment
(1) Embodiment of Magnetic Recording Cartridge
(2) Modified Example of Magnetic Recording Cartridge
4. EXAMPLES In the present description, in a case where a measurement method is described without a particular description of the measurement environment, the measurement is performed under an environment of 25° C.±2° C. and 50% RH±5% RH.

1. Description of Present Technology

As described above, in order to manufacture a coating type magnetic recording tape, a coating material for forming an underlayer is applied onto a base layer to form an underlayer, and then a coating material for forming a magnetic layer is applied onto the underlayer to form a magnetic layer. It has been found that the application of the coating material for forming a magnetic layer causes uneven distribution of the binder contained in the underlayer in the thickness direction.

It has also been found that the uneven distribution of the binder in the underlayer affects the reliability of the magnetic recording tape. Due to the uneven distribution of the binder, the ratio between the inorganic material and the binder in the underlayer is nonuniform in the thickness direction. In some uneven distribution states, the reliability of the magnetic recording tape may deteriorate, resulting in, for example, an increase in possibility of occurrence of a defect requiring a rewrite in recording processing.

The present inventor has found that the reliability of the magnetic recording tape can be improved by controlling the distribution of the binder in the underlayer.

That is, the magnetic recording medium of the present technology includes a magnetic layer, an underlayer, and a base layer in this order. The underlayer contains a chlorine-containing binder, and the underlayer includes the part having a chlorine count equal to or more than the threshold described below.

[Threshold]=[an average chlorine count in the underlayer]+6×[a standard deviation determined in calculation of the average chlorine count]

The chlorine count corresponds to the amount of the chlorine-containing binder. The part equal to or more than the threshold has a higher chlorine count than another part in the underlayer, and in the part, the chlorine-containing binder is present in an amount more than that in another part. That is, the part equal to or more than the threshold is a part in which the chlorine-containing binder is unevenly distributed.

In the magnetic recording medium of the present technology, the range of the part equal to or more than the threshold in the thickness direction, that is, the uneven distribution range is controlled. Thus, the reliability of the magnetic recording medium, for example, the reliability at the time of traveling for recording processing, is improved.

In an embodiment of the present technology, the part having a chlorine count equal to or more than the threshold described below in the underlayer may have a thickness of, for example, 130 nm or less, preferably 125 nm or less, and more preferably 120 nm or less, 115 nm or less, 110 nm or less, 105 nm or less, 100 nm or less, 95 nm or less, or 90 nm or less. The thickness of the part equal to or more than the threshold means a length of the part having a chlorine count equal to or more than the threshold in the thickness direction of the magnetic recording medium.

Furthermore, the thickness of the part may be, for example, 30 nm or more, 40 nm or more, or 50 nm or more.

If the thickness of the part equal to or more than the threshold is within the above-described numerical range, that is, the uneven distribution range is as small as described above, the reliability of the magnetic recording medium can be enhanced. For example, occurrence of a rewrite in recording processing can be prevented.

In another embodiment of the present technology, the part having a chlorine count equal to or more than the threshold in the underlayer may have a thickness of, for example, 12% or less, preferably 11% or less, and furthermore, 10% or less, or 9% or less of the thickness of the underlayer. Also in this embodiment, the thickness of the part equal to or more than the threshold means a length of the part having a chlorine count equal to or more than the threshold in the thickness direction of the magnetic recording medium.

Furthermore, the thickness of the part may be, for example, 4% or more, or 5% or more.

If the thickness of the part equal to or more than the threshold is within the above-described numerical range, that is, the uneven distribution range is as small as described above, the reliability of the magnetic recording medium can be enhanced. For example, occurrence of a rewrite in recording processing can be prevented.

The part equal to or more than the threshold is preferably present in a side close to the base layer in the underlayer. For example, in a case where the underlayer is divided in half into a region of a side close to the magnetic layer and a region of a side close to the base layer in the thickness direction of the magnetic recording medium, the part equal to or more than the threshold may be present in the region of the side close to the base layer.

The part equal to or more than the threshold may be more preferably present within 200 nm, and may be preferably present within 150 nm, and particularly preferably within 130 nm, 120 nm, 110 nm, or 100 nm from the interface between the underlayer and the base layer in the underlayer. In a particularly preferred embodiment, the part equal to or more than the threshold may be present so as to be in contact with the interface between the underlayer and the base layer.

Such control of the position of the part equal to or more than the threshold, that is, the position of the part in which the chlorine-containing binder is unevenly distributed, also contributes to improvement in the reliability of the magnetic recording medium.

In the underlayer, the chlorine-containing binder may be adsorbed to the inorganic material contained in the underlayer, or may be present without being adsorbed to the inorganic material. The above-described uneven distribution of the chlorine-containing binder is considered to be mainly due to the chlorine-containing binder not adsorbed to the inorganic material. It is considered that control of the uneven distribution of the chlorine-containing binder can improve the reliability of the magnetic recording medium. This is described in more detail below.

When the coating material for forming a magnetic layer is applied, the solvent in the coating material affects the distribution state of the binder contained in the already formed underlayer, and particularly affects the distribution state of the binder present without being adsorbed to the inorganic material.

Some uneven distribution states of the binder increase the possibility of powder fall-off at the initial stage of use of the magnetic recording medium, and the reliability of the magnetic recording medium may deteriorate. For example, in a case where a multi-winding magnetic recording tape travels back and forth one time or in a case where the entire surface of a multi-winding magnetic recording tape is used for recording, the reliability of the magnetic recording tape may be adversely affected.

The reliability of the magnetic recording medium can be improved by narrowing the uneven distribution range of the chlorine-containing binder according to the present technology, particularly by narrowing the uneven distribution range of the chlorine-containing binder and making the uneven distribution of the chlorine-containing binder present in the side close to the base layer. For example, in recording processing, the possibility of occurrence of a defect requiring a rewrite can be reduced.

The improvement in the reliability is considered to be because the control of the uneven distribution achieves appropriate supply of the lubricant contained in the underlayer to the surface of the magnetic recording medium. As described above, the uneven distribution is due to the chlorine-containing binder not adsorbed to the inorganic material. The chlorine-containing binder not adsorbed to the inorganic material may block pores for supplying the lubricant to the surface and inhibit supply of the lubricant to the surface of the magnetic recording medium.

It is considered that further reducing the uneven distribution range narrows the range in which the chlorine-containing binder not adsorbed to the inorganic material is present and thus can achieve appropriate supply of the lubricant to the surface of the magnetic recording medium.

Furthermore, further reducing the uneven distribution range and making the uneven distribution present in the base layer can more effectively prevent lubricant supply inhibition caused by the chlorine-containing binder blocking pores.

Furthermore, in a case where the amount of the chlorine-containing binder unevenly distributed in the side close to the base is small, a certain amount of the chlorine-containing binder not adsorbed to the inorganic material may be also present in the side close to the interface between the magnetic layer and the underlayer. Also in this case, there is a high possibility that pores are blocked by the chlorine-containing binder not adsorbed to the inorganic material. Therefore, the thickness of the part is preferably 1/25 or more, and more preferably 1/20 or more of the thickness of the underlayer.

Reliability can be improved by controlling the uneven distribution of chlorine-containing binder so that no excess chlorine-containing binder remains on the magnetic layer side. However, the present inventors have found that, since the surface shape of the magnetic layer also changes when the uneven distribution state of the chlorine-containing binder is changed by the dispersion condition of the underlayer, the dispersant, or the like, a new problem (reduction in resolution) tends to occur simply by not leaving an extra chlorine-containing binder on the magnetic layer side. In order to solve this problem, it has been found that a dispersion state of the underlayer suitable for short wavelength recording and the surface treatment in a step are important while adjusting the flow of the chlorine-containing binder.

The output of the magnetic recording medium decreases as the recording wavelength is shorter. However, even in a case where the recording wavelength is short, it is desirable to obtain an output equivalent to that in a case where the recording wavelength is long. For this purpose, it is necessary to increase the output at the time of short wavelength recording to be close to the output at the time of long wavelength recording. Resolution, which is one of electromagnetic conversion characteristics of the magnetic recording medium, can be improved by increasing the output at the time of short wavelength recording.

The present inventors have studied a technique for enhancing resolution of a magnetic recording medium. As a result, the present inventor has found that there is a high correlation between the resolution and a core portion level difference Rk to be described later. The present inventor has also found that thinning the underlayer contributes to improvement of resolution. As a result of further studies, the present inventor has found that a magnetic recording medium in which the core portion level difference Rk is equal to or less than a specific numerical value and the average thickness of the underlayer is equal to or less than a specific numerical value exhibits high resolution. That is, the magnetic recording medium of the present technology includes a magnetic layer and an underlayer, and in a bearing curve created on the basis of height data of a magnetic layer side surface acquired using an atomic force microscope, a core portion level difference Rk is 5.5 nm or less, and an average thickness of the underlayer is 1100 nm or less.

In the magnetic recording medium of the present technology, in a bearing curve created on the basis of height data of a magnetic layer side surface acquired using an atomic force microscope, a core portion level difference Rk is 5.5 nm or less, preferably 5.2 nm or less, more preferably 5.0 nm or less, and even more preferably 4.7 nm or less. If the core portion level difference Rk is within this numerical range, resolution can be improved.

The magnetic recording medium of the present technology exhibits high resolution. This is considered to be because the smooth part of the magnetic layer side surface can be increased by the core portion level difference Rk of the magnetic recording medium of the present technology being equal to or less than a specific numerical value.

The core portion level difference Rk is a value calculated using a bearing curve created on the basis of height data of the magnetic layer side surface acquired using an atomic force microscope, and is considered to reflect the property of the magnetic layer side surface of the magnetic recording medium. Specifically, it is considered that the larger the core portion level difference Rk is, the more the unevenness of the magnetic layer side surface is, and the smaller the core portion level difference Rk is, the more the smooth part of the magnetic layer side surface is. The closer the magnetic layer side surface is to be smooth, the smaller the spacing (distance between the magnetic recording medium and the magnetic head) tends to be. Therefore, in the magnetic recording medium of the present technology in which the core portion level difference Rk is equal to or less than a specific numerical value, it is considered that the smooth part of the magnetic layer side surface can be increased, and thus the spacing can be reduced. This is considered to contribute to improvement of resolution in the magnetic recording medium of the present technology.

The magnetic recording medium according to the present technology may be preferably an elongated magnetic recording medium, and may be, for example, a magnetic recording tape (particularly an elongated magnetic recording tape).

The magnetic recording medium according to the present technology may include a magnetic layer, a non-magnetic layer (underlayer), a base layer, and a back layer in this order, and may include other layers in addition to these layers. The other layers may be appropriately selected according to the type of the magnetic recording medium. The magnetic recording medium may be a coating type magnetic recording medium, that is, may be a magnetic recording medium manufactured by applying a material (particularly, coating material) for forming another layer to a base layer and drying the material.

The average thickness (average total thickness) $t_T$ of the magnetic recording medium according to the present technology may be, for example, 5.5 μm or less, preferably 5.4 μm or less, more preferably 5.3 μm or less, 5.2 μm or less, 5.1 μm or less, 5.0 μm or less, 4.9 μm or less, or 4.8 μm or less, and even more preferably 4.6 μm or less or 4.4 μm or less. Since the magnetic recording medium may be thin as described above, for example, the tape length wound in one magnetic recording cartridge can be made longer, and therefore, the recording capacity per magnetic recording cartridge can be increased. The lower limit of the average thickness (average total thickness) $t_T$ of the magnetic recording medium is not particularly limited, and is, for example, 3.5 $\mu m \leq t_T$. A method for measuring the average thickness of the magnetic recording medium will be described in 2. (3) below.

The average thickness $t_m$ of the magnetic layer of the magnetic recording medium according to the present technology can be preferably 80 nm or less, more preferably 70 nm or less, still more preferably 60 nm or less, or 50 nm or less, and even more preferably 40 nm or less. The lower limit of the average thickness $t_m$ of the magnetic layer is not particularly limited, and can be preferably 30 nm or more. A method of measuring the average thickness of the magnetic layer will be described in 2. (3) below.

The average thickness of the underlayer (also referred to as a non-magnetic layer) of the magnetic recording medium according to the present technology can be 1100 nm or less, preferably 1050 nm or less, 1000 nm or less, 950 nm or less, more preferably 900 nm or less, 850 nm or less, or 800 nm or less, or 700 nm or less, and still more preferably 600 nm or less. Furthermore, the lower limit of the average thickness of the underlayer is not particularly limited, and can be preferably 200 nm or more, and more preferably 300 nm or more. A method of measuring the average thickness of the underlayer will be described in 2. (3) below.

The average thickness of the base layer (also referred to as a base material layer) of the magnetic recording medium according to the present technology can be preferably 4.5 μm or less, more preferably 4.2 μm or less, 4.0 μm or less, 3.8 μm or less, or 3.6 μm or less, and even more preferably 3.4 μm or less, 3.2 μm or less, or 3.0 μm or less. Furthermore, the lower limit of the average thickness of the base layer is not particularly limited, but may be, for example, preferably 2.0 μm or more, 2.2 μm or more, 2.4 μm or more, and more preferably 2.5 μm or more. A method of measuring the average thickness of the base layer will be described in 2. (3) below.

The average thickness of the back layer of the magnetic recording medium according to the present technology can be preferably 0.6 μm or less, more preferably 0.5 μm or less, and even more preferably 0.4 μm or less, 0.3 μm or less, 0.25 μm or less, or 0.2 μm or less. Furthermore, the lower limit of the average thickness of the back layer is not particularly limited, but may be, for example, preferably 0.1 μm or more, and more preferably 0.15 μm or more. A method of measuring the average thickness of the back layer will be described in 2. (3) below.

The total thickness of the magnetic layer and the underlayer of the magnetic recording medium according to the present technology is preferably 1000 nm or less, and may be, for example, 950 nm or less, 900 nm or less, or 800 nm or less. Furthermore, the total thickness may be, for example, 300 nm or more, and particularly 400 nm or more.

The magnetic recording medium according to the present technology can have, for example, at least one data band and at least two servo bands. The number of data bands can be, for example, 2 to 10, particularly 3 to 6, and more particularly 4 or 5. The number of servo bands can be, for example, 3 to 11, particularly 4 to 7, and more particularly 5 or 6. These servo bands and data bands may be arranged, for example, so as to extend in the longitudinal direction of the elongated magnetic recording medium (particularly, magnetic recording tape), and in particular, so as to be substantially parallel. The data bands and the servo bands can be provided in the magnetic layer. Examples of the magnetic recording medium having the data bands and the servo bands as described above include a magnetic recording tape conforming to the Linear Tape-Open (LTO) standard. That is, the magnetic recording medium according to the present technology may be a magnetic recording tape conforming to the LTO standard. For example, the magnetic recording medium according to the present technology may be a magnetic recording tape conforming to LTO8 or a later standard (for example, LTO9, LTO10, LTO11, LTO12, or the like).

The width of the elongated magnetic recording medium (particularly, magnetic recording tape) according to the present technology can be, for example, 5 mm to 30 mm, particularly 7 mm to 25 mm, more particularly 10 mm to 20 mm, and still more particularly 11 mm to 19 mm. The length of the elongated magnetic recording medium (particularly, magnetic recording tape) can be, for example, 500 m to 1500 m. For example, the tape width conforming to the LTO8 standard is 12.65 mm, and the length is 960 m.

2. First Embodiment

(1) Configuration of Magnetic Recording Medium

First, a configuration of a magnetic recording medium 10 according to a first embodiment will be described with reference to FIG. 1. The magnetic recording medium 10 is, for example, a magnetic recording medium subjected to vertical orientation processing. The magnetic recording medium 10 includes an elongated base layer (also referred to as a substrate) 11, an underlayer 12 provided on one principal surface of the base layer 11, a magnetic layer (also referred to as a recording layer) 13 provided on the underlayer 12, and a back layer 14 provided on the other principal surface of the base layer 11, as illustrated in FIG. 1. Hereinafter, among both the principal surfaces of the magnetic recording medium 10, the surface the side on which the magnetic layer 13 is provided will be referred to as a magnetic surface, and the surface opposite side from the magnetic surface (the surface on the side which the back layer 14 is provided) will be referred to as a back surface.

The magnetic recording medium 10 has an elongated shape and travels in the longitudinal direction during recording and reproducing. Furthermore, the magnetic recording medium 10 may be configured to be capable of recording a signal at the shortest recording wavelength of preferably 60 nm or less, more preferably 50 nm or less, still more preferably 45 nm or less, and particularly preferably 40 nm or less, and can be used, for example, in a recording and reproducing apparatus whose shortest recording wavelength is in the above-described range. The recording and reproducing apparatus may include a ring type head as a recording head. The recording track width is, for example, 2 μm or less.

(2) Description of Each Layer (Base Layer)

The base layer 11 can function as a support body of the magnetic recording medium 10, and is, for example, an elongated flexible non-magnetic substrate, and particularly, may be a non-magnetic film. The base layer 11 can contain, for example, at least one of a polyester-based resin, a polyolefin-based resin, a cellulose derivative, a vinyl-based resin, an aromatic polyether ketone resin, or other polymer resins. In a case where the base layer 11 contains two or more of the above-described materials, the two or more materials may be mixed, copolymerized, or layered.

The polyester-based resin may be, for example, one or a mixture of two or more of polyethylene terephthalate (PET), polyethylene naphthalate (PEN), polybutylene terephthalate (PBT), polybutylene naphthalate (PBN), polycyclohexylenedimethylene terephthalate (PCT), polyethylene-p-oxybenzoate (PEB), and polyethylene bisphenoxycarboxylate. According to a preferred embodiment of the present technology, the base layer 11 may include PET or PEN.

The polyolefin-based resin may be, for example, one or a mixture of two or more of polyethylene (PE) and polypropylene (PP).

The cellulose derivative may be, for example, one or a mixture of two or more of cellulose diacetate, cellulose triacetate, cellulose acetate butyrate (CAB), and cellulose acetate propionate (CAP).

The vinyl-based resin may be, for example, one or a mixture of two or more of polyvinyl chloride (PVC) and polyvinylidene chloride (PVDC).

The aromatic polyether ketone resin may be, for example, one or a mixture of two or more of polyether ketone (PEK), polyether ether ketone (PEEK), polyether ketone ketone (PEKK), and polyether ether ketone ketone (PEEKK). According to a preferred embodiment of the present technology, the base layer 11 may include PEEK.

The other polymer resins may be, for example, one or a mixture of two or more of a polyamide, nylon (PA), an aromatic polyamide, aramid (aromatic PA), a polyimide (PI), an aromatic polyimide (aromatic PI), a polyamideimide (PAI), an aromatic polyamideimide (aromatic PAI), polybenzoxazole such as Zylon (registered trademark) (PBO), a polyether, a polyether ester, polyether sulfone (PES), polyether imide (PEI), polysulfone (PSF), polyphenylene sulfide (PPS), polycarbonate (PC), polyarylate (PAR), and a polyurethane (PU).

The base layer may include a resin containing no chlorine, and particularly may include a polyester-based resin containing no chlorine. Note that the base layer may include a chlorine-containing resin.

(Magnetic Layer)

The magnetic layer 13 may be, for example, a perpendicular recording layer. The magnetic layer 13 contains a magnetic powder. The magnetic layer 13 can further contain a binder. The magnetic layer 13 may further contain non-magnetic particles. The magnetic layer 13 may further contain, for example, an additive such as a lubricant, a corrosion inhibitor, or the like, as needed.

The magnetic layer 13 is preferably a vertically oriented magnetic layer. In the present description, the word "vertical orientation" indicates that the squareness ratio S1 measured in the longitudinal direction (traveling direction) of the magnetic recording medium 10 is 35% or less.

(Magnetic Powder)

Examples of the magnetic particles forming the magnetic powder contained in the magnetic layer 13 can include hexagonal ferrite, epsilon type iron oxide (ε-iron oxide), Co-containing spinel ferrite, gamma hematite, magnetite, chromium dioxide, cobalt-coated iron oxide, a metal, and the like, but are not limited thereto. The magnetic powder may be one or a combination of two or more thereof. The magnetic powder can preferably contain hexagonal ferrite, ε-iron oxide, or Co-containing spinel ferrite. The magnetic powder is particularly preferably hexagonal ferrite. The hexagonal ferrite can particularly preferably contain at least one of Ba or Sr. The ε-iron oxide can particularly preferably contain at least one of Al or Ga. These magnetic particles may be appropriately selected by those skilled in the art on the basis of factors such as the method of manufacturing the magnetic layer 13, a specification of the tape, a function of the tape, and the like.

A shape of the magnetic particles depends on a crystal structure of the magnetic particles. For example, barium ferrite (BaFe) and strontium ferrite can have a hexagonal plate-like shape. The ε-iron oxide can have a spherical shape. Cobalt ferrite can have a cubic shape. The metal can have a spindle shape. These magnetic particles are oriented in a manufacturing process of the magnetic recording medium 10.

(Embodiment in which Magnetic Powder Contains Hexagonal Ferrite)

The hexagonal ferrite particles contain Fe and a metal M1 other than Fe. The metal M1 contains an alkaline earth metal. The alkaline earth metal may contain at least one or two or more of Sr, Ba, and Ca, and preferably contains Sr among these metals. The metal M1 may contain Pb in addition to the alkaline earth metal.

The hexagonal ferrite particles may further contain a metal M2 in addition to Fe and the metal M1. The metal M2 contains, for example, one selected from the group consisting of a rare earth element, a transition metal element other than Fe, and a metal element of Group 13 of the periodic table, and among these, at least one selected from the group consisting of Ti, Al, and Nd is preferable.

Specifically, the hexagonal ferrite particles may be, for example, barium ferrite particles or strontium ferrite particles. In the present disclosure, the strontium ferrite particles refer to hexagonal ferrite particles having an atomic ratio of Sr to the metal M1 of 50 atom % or more. Therefore, the hexagonal ferrite particles containing Sr and the metal M1 other than Sr are contained in the strontium ferrite particles in a case where the atomic ratio of Sr to the metal M1 is 50 atom % or more. For example, in a case where the metal M1 contains Sr and Ba, hexagonal ferrite particles in which the atomic ratio of Sr to the total amount of Sr and Ba is 50 atom % or more are referred to as barium ferrite particles.

More specifically, the hexagonal ferrite may have an average composition represented by the following general formula (1).

$$Sr(1-x)\alpha x Fe(12-y)\beta y O_{19} \quad (1)$$

(In the formula (1), α represents at least one selected from the group consisting of Ba, Ca, and Pb. β represents at least one selected from the group consisting of rare earth elements, transition metal elements other than Fe, and metal elements of Group 13 of the periodic table. x is within a range of $0 \leq x \leq 0.9$, preferably $0 \leq x \leq 0.7$, still more preferably $0.3 \leq x \leq 0.7$. y represents $0 \leq y \leq 0.80$, preferably $0.22 \leq y \leq 0.80$, more preferably $0.26 \leq y \leq 0.80$.)

In a case where the magnetic powder includes a powder of hexagonal ferrite particles, the average particle size of the magnetic powder can be preferably 30 nm or less, more preferably 25 nm or less, and even more preferably 20 nm or less, 18 nm or less, 16 nm or less, 14 nm or less, or 12 nm or less. The average particle size can be, for example, 8 nm or more, preferably 9 nm or more, and more preferably 10 nm or more. For example, the average particle size of the magnetic powder may be 8 nm or more and 30 nm or less, 8 nm or more and 25 nm or less, 9 nm or more and 20 nm or less, 9 nm or more and 16 nm or less, or 9 nm or more and 14 nm or less. In a case where the average particle size of the magnetic powder is the above-described upper limit or less (for example, 30 nm or less, and particularly 20 nm or less), an excellent electromagnetic conversion characteristic (for example, SNR) can be obtained in the magnetic recording medium 10 having a high recording density. In a case where the average particle size of the magnetic powder is the above-described lower limit or more (for example, 8 nm or more, and preferably 9 nm or more), the dispersibility of the magnetic powder is further improved, and a more excellent electromagnetic conversion characteristic (for example, SNR) can be obtained.

In a case where the magnetic powder includes a powder of hexagonal ferrite particles, the average aspect ratio of the magnetic powder can be preferably 1.0 or more and 3.0 or less, more preferably 1.0 or more and 2.8 or less, and even more preferably 1.5 or more and 2.5 or less. If the average aspect ratio of the magnetic powder is within the above-described numerical range, aggregation of the magnetic powder can be suppressed and in addition, moreover, when the magnetic powder is vertically oriented in a step of forming the magnetic layer 13, resistance applied to the magnetic powder can be suppressed. As a result, the vertical orientation of the magnetic powder can be improved.

In a case where the magnetic powder includes a hexagonal ferrite particle powder, the average particle size and the average aspect ratio of the magnetic powder are determined as follows. First, a magnetic recording medium (hereinafter, also referred to as a "magnetic tape") accommodated in a magnetic recording cartridge is unwound, and a magnetic tape to be measured is cut out by about 50 mm. For example, in the case of a magnetic recording cartridge 10A as illustrated in FIG. 19, the cut-out position may be a position 30 m from a connection portion 221 between the magnetic tape T and the leader tape LT in the longitudinal direction. Subsequently, the magnetic tape to be measured is processed with a FIB method and the like to perform thinning. In a case where the FIB method is used, formation of a carbon layer and a tungsten layer as protective films is performed as pre-processing for observing a TEM image of a cross section described below. The carbon layer is formed on a magnetic layer side surface and a back layer side surface of the magnetic tape with a vapor deposition method, and then the tungsten layer is further formed on the magnetic layer side surface with a vapor deposition method or a sputtering method. The thinning is performed in the length direction (longitudinal direction) of the magnetic tape. That is, the thinning is performed to form a cross section parallel to both the longitudinal direction and the thickness direction of the magnetic tape.

Using a transmission electron microscope (H-9500 manufactured by Hitachi High-Technologies Corporation), the above-described cross section of the obtained thin piece sample is observed at an acceleration voltage of 200 kV and a total magnification of 500,000 times so that the entire magnetic layer is included in the thickness direction of the magnetic layer, and a TEM photo is imaged. The number of TEM photos prepared is such that 50 particles can be extracted in which the plate diameter DB and the plate thickness DA (see FIG. 2A) shown below can be measured.

Figure 2A:
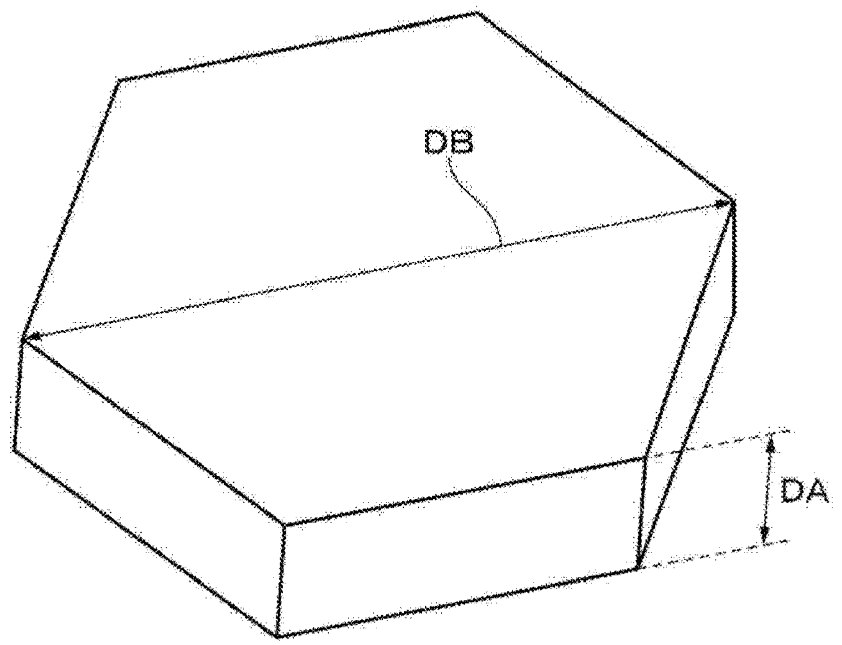
FIG. 2A is a view illustrating an example of a shape of a particle of a magnetic powder.

In the present description, the size of the hexagonal ferrite particle (hereinafter, referred to as the "particle size") is determined as follows. In a case where a particle observed in the TEM photo has a plate shape or a columnar shape as illustrated in FIG. 2A (note that the thickness or height is smaller than the long diameter of the plate surface or the bottom surface), the value of the long diameter of the plate surface or the bottom surface is the value of the plate diameter DB. The value of the thickness or height of the particle observed in the TEM photo is the value of the plate thickness DA. In a case where a particle observed in the TEM photo has a hexagonal plate surface or bottom surface, the long diameter means the longest diagonal distance. In a case where the thickness or height of one particle is not constant in the particle, the maximum thickness or height of the particle is the plate thickness DA.

Next, 50 particles to be extracted from the imaged TEM photo are selected in accordance with the following criteria. A particle having a part out of the visual field of the TEM photo is not to be measured, and a particle having a clear outline and existing separately is to be measured. In a case where particles overlap, each particle is to be measured as a single particle when the boundary between the particles is clear and the entire shape of each particle can be determined, but a particle in which the boundary is not clear and the entire shape of the particle cannot be determined is not to be measured as the shape of the particle cannot be determined.

Figure 2B:
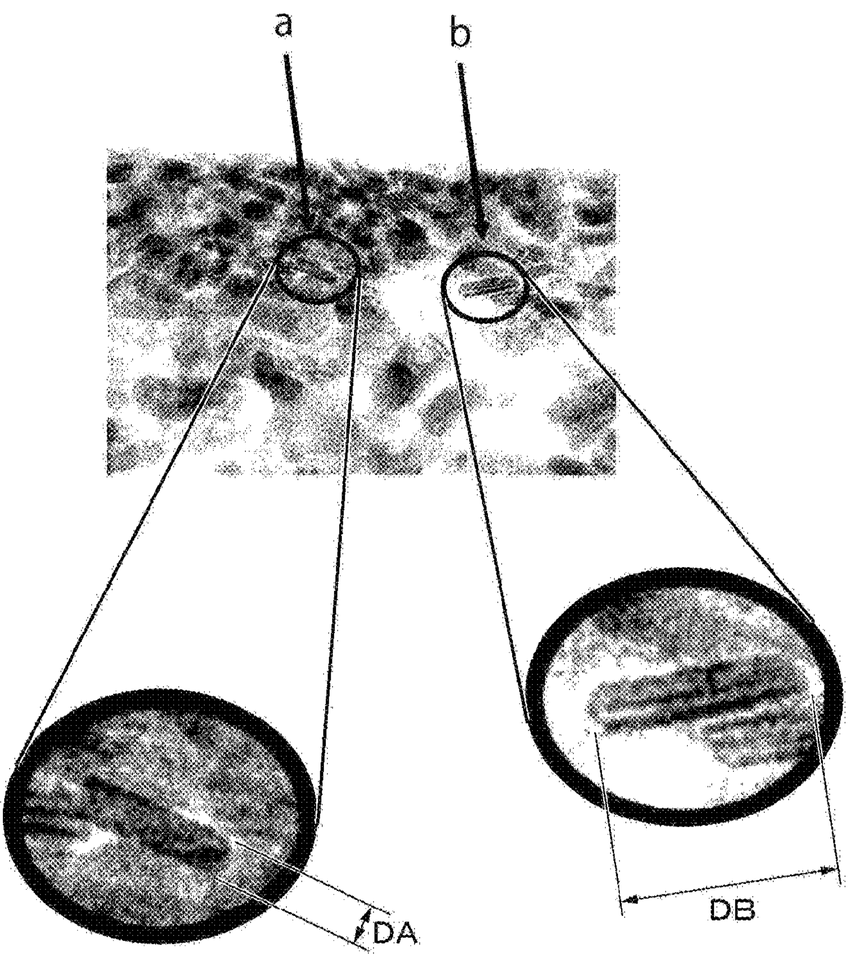
FIG. 2B is an example of a TEM photo of a sample cross section.
Figure 2C:
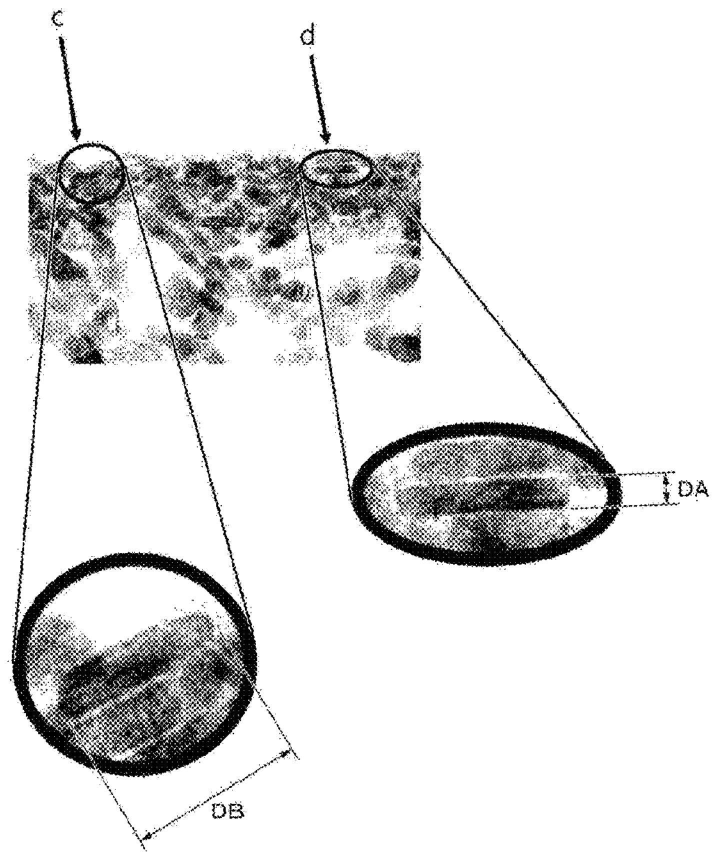
FIG. 2C is another example of a TEM photo of a sample cross section.

FIGS. 2B and 2C show an example of TEM photos. In these figures, for example, the particles indicated by the arrows a and d are selected because the plate thickness of each particle (thickness or height of each particle) DA can be clearly recognized. The plate thickness DA of each of the selected 50 particles is measured. The plate thicknesses DA thus obtained are simply averaged (arithmetically averaged) to obtain an average plate thickness $DA_{ave}$. The average plate thickness $DA_{ave}$ is the average particle plate thickness. Subsequently, the plate diameter DB of each magnetic powder is measured. In order to measure the plate diameter DB of the particles, 50 particles in which the plate diameter DB of each particle can be clearly recognized are selected from the imaged TEM photo. For example, in these figures, the particles, for example, indicated by the arrows b and c are selected because the plate diameter DB can be clearly recognized. The plate diameter DB of each of the selected 50 particles is measured. The plate diameters DB thus obtained are simply averaged (arithmetically averaged) to obtain an average plate diameter $DB_{ave}$. The average plate diameter $DB_{ave}$ is the average particle size.

In a case where the magnetic powder includes a powder of hexagonal ferrite particles, the average particle volume of the magnetic powder may be preferably 1800 $nm^3$ or less, more preferably 1600 $nm^3$ or less, more preferably 1400 $nm^3$ or less, and even more preferably 1200 $nm^3$ or less, 1000 $nm^3$ or less, or 900 $nm^3$ or less. The average particle volume of the magnetic powder can be preferably 500 $nm^3$ or more, and more preferably 700 $nm^3$ or more.

In a case where the average particle volume of the magnetic powder is the above-described upper limit or less (for example, 2000 $nm^3$ or less), an excellent electromagnetic conversion characteristic (for example, SNR) can be obtained in the magnetic recording medium 10 having a high recording density. In a case where the average particle volume of the magnetic powder is the above-described lower limit or more (for example, 500 $nm^3$ or more), the dispersibility of the magnetic powder is further improved, and a more excellent electromagnetic conversion characteristic (for example, SNR) can be obtained.

The average particle volume of the magnetic powder is determined as follows. First, as described regarding the method of calculating the average particle size of the magnetic powder, the average plate thickness $DA_{ave}$ and the average plate diameter $DB_{ave}$ are determined. Next, the average particle volume V of the magnetic powder is determined with the following formula.

$$V = \frac{3\sqrt{3}}{8} \times DA_{ave} \times DB_{ave} \times DB_{ave}. \quad \text{[Mathematical Formula 1]}$$

According to a particularly preferred embodiment of the present technology, the magnetic powder can be a barium ferrite magnetic powder or a strontium ferrite magnetic powder, and more preferably a barium ferrite magnetic powder. A barium ferrite magnetic powder contains iron oxide magnetic particles including barium ferrite as a main phase (hereinafter, referred to as "barium ferrite particles"). A barium ferrite magnetic powder has high reliability of data recording so that, for example, the coercivity does not deteriorate even in a high-temperature and high-humidity environment. From such a viewpoint, a barium ferrite magnetic powder is preferable as the magnetic powder.

The average particle size of the barium ferrite magnetic powder can be preferably 30 nm or less, more preferably 25 nm or less, and even more preferably 20 nm or less, 18 nm or less, 16 nm or less, 14 nm or less, or 12 nm or less. The average particle size can be, for example, 8 nm or more, preferably 9 nm or more, and more preferably 10 nm or more. For example, the average particle size of the magnetic powder may be 8 nm or more and 30 nm or less, 8 nm or more and 25 nm or less, 9 nm or more and 20 nm or less, 9 nm or more and 16 nm or less, or 9 nm or more and 14 nm or less.

In a case where the magnetic layer 13 contains a barium ferrite magnetic powder as the magnetic powder, the average thickness $t_m$ [nm] of the magnetic layer 13 is preferably 80 nm or less, and more preferably 70 nm or less. For example, the average thickness $t_m$ of the magnetic layer 13 may be 30 nm$\leq t_m \leq$80 nm or 30 nm$\leq t_m \leq$70 nm.

Furthermore, the coercive force Hc1 measured in the thickness direction (vertical direction) of the magnetic recording medium 10 is preferably 2010 [Oe] or more and 3520 [Oe] or less, more preferably 2070 [Oe] or more and 3460 [Oe] or less, and still more preferably 2140 [Oe] or more and 3390 [Oe] or less.

(Embodiment in which Magnetic Powder Contains ε-Iron Oxide)

According to another preferred embodiment of the present technology, the magnetic powder can preferably include a powder of nanoparticles containing ε-iron oxide (hereinafter, referred to as "ε-iron oxide particles"). Even if fine particles, the ε-iron oxide particles can obtain high coercive force. ε-Iron oxide contained in the ε-iron oxide particles is preferably crystal-oriented preferentially in the thickness direction (vertical direction) of the magnetic recording medium 10.

The ε-iron oxide particles may have a structure of composite particles. More specifically, the ε-iron oxide particle includes an ε-iron oxide portion and a portion having soft magnetism or a portion having magnetism in which a saturation magnetization amount σs is higher than that of ε-iron oxide and a coercive force Hc is smaller than that of ε-iron oxide (hereinafter, referred to as a "portion having soft magnetism and the like").

The ε-iron oxide portion contains ε-iron oxide. The ε-iron oxide contained in the ε-iron oxide portion preferably includes an ε-$Fe_2O_3$ crystal as a main phase, and more preferably includes a single-phase ε-$Fe_2O_3$.

The portion having soft magnetism and the like are in contact with at least a part of the ε-iron oxide portion. Specifically, the portion having soft magnetism and the like may partially cover the ε-iron oxide portion, and may partially cover an entire periphery of the ε-iron oxide portion.

The portion having soft magnetism (portion having magnetism in which the saturation magnetization amount σs is higher than that of ε-iron oxide and the coercive force Hc is smaller than that of ε-iron oxide) includes, for example, a soft magnetic material such as α-Fe, a Ni—Fe alloy, an Fe—Si—Al alloy, and the like. α-Fe may also be obtained by reducing ε-iron oxide contained in the ε-iron oxide portion.

Furthermore, the portion having soft magnetism may contain, for example, $Fe_3O_4$, γ-$Fe_2O_3$, spinel ferrite, and the like.

The ε-iron oxide particle includes the portion having soft magnetism described above and the like, such that the coercive force Hc of the ε-iron oxide particles (composite particles) as a whole can be adjusted to a coercive force Hc suitable for recording while maintaining the coercive force Hc of the ε-iron oxide portion alone at a large value in order to ensure thermal stability.

The ε-iron oxide particle may contain an additive instead of the structure of the composite particles described above, or may have the structure of the composite particles and may contain an additive as well. In this case, a part of Fe of the ε-iron oxide particle is substituted with the additive. The coercive force Hc of all the ε-iron oxide particles can be adjusted to the coercive force Hc suitable for recording also when the ε-iron oxide particle includes the additive, such that recordability can be improved. The additive is a metal element other than iron, preferably a trivalent metal element, more preferably at least one selected from the group consisting of Al, Ga, and In, and even more preferably at least one selected from the group consisting of Al and Ga.

Specifically, the ε-iron oxide containing an additive is an ε-$Fe_{2-x}M_xO_3$ crystal (here, M is a metal element other than iron, preferably a trivalent metal element, and more preferably one or more selected from the group consisting of Al, Ga, and In, and x satisfies, for example, $0<x<1$.).

The average particle size (average maximum particle size) of the magnetic powder is preferably 22 nm or less, more preferably 8 nm or more and 22 nm or less, and even more preferably 12 nm or more and 22 nm or less. In the magnetic recording medium 10, a region having a size of ½ of a recording wavelength is an actual magnetization region. For this reason, an excellent SNR can be obtained by setting the average particle size of the magnetic powder to half or less of the shortest recording wavelength. Therefore, if the average particle size of the magnetic powder is 22 nm or less, an excellent electromagnetic conversion characteristic (for example, SNR) can be obtained in the magnetic recording medium 10 having a high recording density (for example, the magnetic recording medium 10 configured to be capable of recording a signal at the shortest recording wavelength of 44 nm or less). Meanwhile, if the average particle size of the magnetic powder is 8 nm or more, the dispersibility of the magnetic powder is further improved, and a more excellent electromagnetic conversion characteristic (for example, SNR) can be obtained.

The average aspect ratio of the magnetic powder is preferably 1.0 or more and 3.0 or less, more preferably 1.0 or more and 2.9 or less, and even more preferably 1.0 or more and 2.5 or less. If the average aspect ratio of the magnetic powder is in the above-described numerical range, aggregation of the magnetic powder can be suppressed, and when the magnetic powder is vertically oriented in a step of forming the magnetic layer 13, resistance applied to the magnetic powder can be suppressed. Therefore, the vertical orientation of the magnetic powder can be improved.

In a case where the magnetic powder contains ε-iron oxide particles, the average particle size and the average aspect ratio of the magnetic powder are determined as follows. First, as described regarding a case where the magnetic powder includes a hexagonal ferrite particle powder, a magnetic recording medium to be measured is cut out. The magnetic recording medium to be measured is processed with a focused ion beam (FIB) method and the like to perform thinning. In a case where the FIB method is used, formation of a carbon film and a tungsten thin film as protective films is performed as pre-processing for observing a TEM image of a cross section described below. The carbon film is formed on a magnetic layer side surface and a back layer side surface of the magnetic recording medium with a vapor deposition method, and then the tungsten thin film is further formed on the magnetic layer side surface with a vapor deposition method or a sputtering method. The thinning is performed in the length direction (longitudinal direction) of the magnetic recording medium. That is, the thinning is performed to form a cross section parallel to both the longitudinal direction and the thickness direction of the magnetic recording medium.

Using a transmission electron microscope (H-9500 manufactured by Hitachi High-Technologies Corporation), the above-described cross section of the obtained thin piece sample is observed at an acceleration voltage of 200 kV and a total magnification of 500,000 times so that the entire magnetic layer 13 is included in the thickness direction of the magnetic layer 13, and a TEM photo is imaged.

Next, 50 particles whose shapes can be clearly recognized are selected from the imaged TEM photo, and a long axis length DL and a short axis length DS of each particle are measured. Here, the long axis length DL means the largest one of the distances between two parallel lines drawn from all angles so as to be in contact with the outline of each particle (so-called maximum Feret diameter). Meanwhile, the short axis length DS means the largest one of the lengths of a particle in a direction orthogonal to the long axis (DL) of the particle.

Subsequently, the measured long axis lengths DL of the 50 particles are simply averaged (arithmetically averaged) to determine the average long axis length $DL_{ave}$. The average long axis length $DL_{ave}$ determined in this manner is regarded as the average particle size of the magnetic powder. Furthermore, the measured short axis lengths DS of the 50 particles are simply averaged (arithmetically averaged) to determine the average short axis length $DS_{ave}$. Then, the average aspect ratio ($DL_{ave}/DS_{ave}$) of the particles is determined from the average long axis length $DL_{ave}$ and the average short axis length $DS_{ave}$.

The average particle volume of the magnetic powder may be preferably 1800 $nm^3$ or less, more preferably 1600 $nm^3$ or less, more preferably 1400 $nm^3$ or less, and even more preferably 1200 $nm^3$ or less, 1100 $nm^3$ or less, or 1000 $nm^3$ or less. The average particle volume of the magnetic powder can be preferably 500 $nm^3$ or more, and more preferably 700 $nm^3$ or more.

In a case where the average particle volume of the magnetic powder is the above-described upper limit or less (for example, 2000 $nm^3$ or less), an excellent electromagnetic conversion characteristic (for example, SNR) can be obtained in the magnetic recording medium 10 having a high recording density. In a case where the average particle volume of the magnetic powder is the above-described lower limit or more (for example, 500 $nm^3$ or more), the dispersibility of the magnetic powder is further improved, and a more excellent electromagnetic conversion characteristic (for example, SNR) can be obtained.

In a case where the ε-iron oxide particles have a spherical shape or a substantially spherical shape, the average particle volume of the magnetic powder is determined as follows. First, the average long axis length $DL_{ave}$ is determined in a manner similar to the above-described method of calculating the average particle size of the magnetic powder. Next, the average particle volume V of the magnetic powder is determined with the following formula.

$$V=(\pi/6)\times DL_{ave}^3$$

In a case where the ε-iron oxide particles have a cubic shape, the average particle volume of the magnetic powder is determined as follows. The magnetic recording medium 10 is processed with a focused ion beam (FIB) method and the like to perform thinning. In a case where the FIB method is used, formation of a carbon film and a tungsten thin film as protective films is performed as pre-processing for observing a TEM image of a cross section described below. The carbon film is formed on a magnetic layer side surface and a back layer side surface of the magnetic recording medium 10 with a vapor deposition method, and then the tungsten thin film is further formed on the magnetic layer side surface with a vapor deposition method or a sputtering method. The thinning is performed in the length direction (longitudinal direction) of the magnetic recording medium 10. That is, the thinning is performed to form a cross section parallel to both the longitudinal direction and the thickness direction of the magnetic recording medium 10.

Using a transmission electron microscope (H-9500 manufactured by Hitachi High-Technologies Corporation), a cross section of the obtained thin piece sample is observed at an acceleration voltage of 200 kV and a total magnification of 500,000 times so that the entire magnetic layer 13 is included in the thickness direction of the magnetic layer 13, and a TEM photo is obtained. Note that the magnification and the acceleration voltage may be appropriately adjusted according to the type of the apparatus.

Next, 50 particles whose shapes can be clearly identified are selected from the imaged TEM photo, and the side length DC of each particle is measured. Subsequently, the measured side lengths DC of the 50 particles are simply averaged (arithmetically averaged) to determine the average side length $DC_{ave}$. Next, the average particle volume $V_{ave}$ of the magnetic powder (particle volume) is determined from the following formula using the average side length $DC_{ave}$.

$$V_{ave}=DC_{ave}^3$$

The coercive force Hc of the ε-iron oxide particles is preferably 2500 Oe or more, and more preferably 2800 Oe or more and 4200 e or less.

(Embodiment in which Magnetic Powder Contains Co-Containing Spinel Ferrite)

According to still another preferred embodiment of the present technology, the magnetic powder can include a powder of nanoparticles containing Co-containing spinel ferrite (hereinafter, also referred to as "cobalt ferrite particles"). That is, the magnetic powder can be a cobalt ferrite magnetic powder. The cobalt ferrite particles preferably have uniaxial crystal anisotropy. The cobalt ferrite magnetic particles have, for example, a cubic shape or a substantially cubic shape. The Co-containing spinel ferrite may further contain one or more selected from the group consisting of Ni, Mn, Al, Cu, and Zn in addition to Co.

The cobalt ferrite has, for example, an average composition represented by the following formula.

$$Co_xM_yFe_2O_z$$

Here, in the formula, M is, for example, one or more metals selected from the group consisting of Ni, Mn, Al, Cu, and Zn, x is a value within a range of $0.4\leq x\leq 1.0$, y is a value within a range of $0\leq y\leq 0.3$, where x and y satisfy a relationship of $(x+y)\leq 1.0$, z is a value within a range of $3\leq z\leq 4$, and a part of Fe may be substituted with another metal element.

The average particle size of the cobalt ferrite magnetic powder is preferably 21 nm or less, and more preferably 19 nm or less. The coercive force Hc of the cobalt ferrite magnetic powder is preferably 2500 Oe or more, and more preferably 2600 Oe or more and 3500 Oe or less.

In a case where the magnetic powder includes a powder of cobalt ferrite particles, the average particle size of the magnetic powder is preferably 25 nm or less, and more preferably 10 nm or more and 19 nm or less. If the average particle size of the magnetic powder is as small as described above, an excellent electromagnetic conversion characteristic (for example, SNR) can be obtained in the magnetic recording medium 10 having a high recording density. Meanwhile, if the average particle size of the magnetic powder is 10 nm or more, the dispersibility of the magnetic powder is further improved, and a more excellent electromagnetic conversion characteristic (for example, SNR) can be obtained. In a case where the magnetic powder includes a powder of cobalt ferrite particles, the average aspect ratio and the average particle size of the magnetic powder are determined with the same method as in a case where the magnetic powder contains ε-iron oxide particles.

The average particle volume of the magnetic powder may be preferably 2000 $nm^3$ or less, more preferably 1900 $nm^3$ or less, more preferably 1800 $nm^3$ or less, and even more preferably 1700 $nm^3$ or less, 1600 $nm^3$ or less, or 1500 $nm^3$ or less. The average particle volume of the magnetic powder can be preferably 500 $nm^3$ or more, and more preferably 700 $nm^3$ or more.

In a case where the average particle volume of the magnetic powder is the above-described upper limit or less (for example, 2000 $nm^3$ or less), an excellent electromagnetic conversion characteristic (for example, SNR) can be obtained in the magnetic recording medium 10 having a high recording density. In a case where the average particle volume of the magnetic powder is the above-described lower limit or more (for example, 500 $nm^3$ or more), the dispersibility of the magnetic powder is further improved, and a more excellent electromagnetic conversion characteristic (for example, SNR) can be obtained.

(Binder)

As the binder, a resin having a structure in which a crosslinking reaction is imparted to a polyurethane-based resin, a vinyl chloride-based resin, or the like is preferable. However, the binder is not limited thereto, and other resins may be appropriately blended according to a physical property and the like required for the magnetic recording medium 10. The resin to be blended is not particularly limited usually as long as it is generally used in a coating type magnetic recording medium 10.

Examples of the binder include polyvinyl chloride, polyvinyl acetate, a vinyl chloride-vinyl acetate copolymer, a vinyl chloride-vinylidene chloride copolymer, a vinyl chloride-acrylonitrile copolymer, an acrylic acid ester-acrylonitrile copolymer, an acrylic acid ester-vinyl chloride-vinylidene chloride copolymer, an acrylic acid ester-vinylidene chloride copolymer, a methacrylic acid ester-vinylidene chloride copolymer, a methacrylic acid ester-vinyl chloride copolymer, a methacrylic acid ester-ethylene copolymer, polyvinyl fluoride, a vinylidene chloride-acrylonitrile copolymer, an acrylonitrile-butadiene copolymer, a polyamide resin, polyvinyl butyral, a cellulose derivative (cellulose acetate butyrate, cellulose diacetate, cellulose triacetate, cellulose propionate, or nitrocellulose), a styrene-butadiene copolymer, a polyester resin, an amino resin, synthetic rubber, and the like.

Furthermore, as the binder, a thermosetting resin or a reactive resin may be used, and examples thereof include a phenol resin, an epoxy resin, a urea resin, a melamine resin, an alkyd resin, a silicone resin, a polyamine resin, a urea-formaldehyde resin, and the like.

Furthermore, a polar functional group such as $—SO_3M$, $—OSO_3M$, —COOM, $P{=}O(OM)_2$, or the like may be introduced into each binding agent described above in order to improve the dispersibility of the magnetic powder. Here, in the formula, M is a hydrogen atom or an alkali metal such as lithium, potassium, sodium, or the like.

Moreover, examples of the polar functional group include a side chain type having an end group of —NR1R2 or $—NR1R2R3^+X^-$ and a main chain type of $>NR1R2^+X^-$. Here, in the formulae, each of R1, R2, and R3 is a hydrogen atom or a hydrocarbon group, and $X^-$ is an ion of a halogen element such as fluorine, chlorine, bromine, iodine, or the like, or an inorganic or organic ion. Furthermore, examples of the polar functional group include —OH, —SH, —CN, an epoxy group, and the like.

In an embodiment of the present technology, the magnetic layer contains a chlorine-containing binder. The chlorine-containing binder may be a chlorine-containing resin. The chlorine-containing resin is a resin containing a chlorine atom as at least one of elements included in the resin.

The chlorine-containing binder is, for example, a vinyl chloride-based resin. More specific examples of the chlorine-containing binder include polyvinyl chloride, a vinyl chloride-vinyl acetate copolymer, a vinyl chloride-vinylidene chloride copolymer, a vinyl chloride-acrylonitrile copolymer, an acrylic acid ester-vinyl chloride-vinylidene chloride copolymer, an acrylic acid ester-vinylidene chloride copolymer, a methacrylic acid ester-vinylidene chloride copolymer, a methacrylic acid ester-vinyl chloride copolymer, a vinylidene chloride-acrylonitrile copolymer, synthetic rubber, and the like.

The content of the chlorine-containing binder in the magnetic layer may be, for example, preferably 30 parts by mass or more, more preferably 35 parts by mass or more, and still more preferably 40 parts by mass or more with respect to 100 parts by mass of the magnetic powder. Furthermore, the content may be, for example, preferably 70 parts by mass or less, more preferably 65 parts by mass or less, and still more preferably 60 parts by mass or less with respect to 100 parts by mass of the magnetic powder.

The magnetic layer may further contain a chlorine-free binder in addition to the chlorine-containing binder. The chlorine-free binder may be a chlorine-free resin. The chlorine-free resin may contain, for example, a polyurethane-based resin. The polyurethane-based resin is a polymer having a urethane bond (—NH—C(=O)—), and may be manufactured by, for example, a polyaddition reaction between an isocyanate compound and a diol compound. The polyurethane-based resin may be, for example, a urethane-modified copolyester. The urethane-modified copolyester may be a urethane-modified copolyester having a basic skeleton of an aromatic polyester and having a side chain containing a urethane component, or a urethane-modified copolyester having a basic skeleton including a repeating unit of an ester and a repeating unit of a urethane.

The content of the chlorine-free binder in the magnetic layer may be, for example, preferably 1 part by mass or more, more preferably 2 parts by mass or more, and still more preferably 3 parts by mass or more with respect to 100 parts by mass of the magnetic powder. Furthermore, the content may be, for example, preferably 10 parts by mass or less, more preferably 9 parts by mass or less, and still more preferably 8 parts by mass or less with respect to 100 parts by mass of the magnetic powder.

(Lubricant)

The magnetic layer can contain a lubricant. The lubricant may be, for example, one or two or more selected from fatty acids and/or fatty acid esters, and can preferably contain both a fatty acid and a fatty acid ester. The fatty acid may be preferably a compound represented by the general chemical formula (1) or the general chemical formula (2) described below. For example, one or both of a compound represented by the general chemical formula (1) and a compound represented by the general chemical formula (2) described below may be contained as the fatty acid.

Furthermore, the fatty acid ester may be preferably a compound represented by the general chemical formula (3) or the general chemical formula (4) or the general chemical formula (5) described below. For example, as the fatty acid ester, any one of a compound represented by the general chemical formula (3) described below and compounds represented by the general chemical formula (4) and the general chemical formula (5) may be contained, or two or more compounds selected from these compounds may be contained.

When the lubricant contains any one or both of the compound represented by the general chemical formula (1) and the compound represented by the general chemical formula (2), and any one or two or more selected from of the compound represented by the general chemical formula (3), the compound represented by the general chemical formula (4), and the general chemical formula (5), an increase in dynamic frictional coefficient due to repeated recording or reproducing on the magnetic recording medium can be suppressed.

$$CH_3(CH_2)_kCOOH \tag{1}$$

Here, in the general chemical formula (1), k is an integer selected from a range of 14 or more and 22 or less, and more preferably a range of 14 or more and 18 or less.

$$CH_3(CH_2)_nCH{=}CH(CH_2)_mCOOH \tag{2}$$

Here, in the general chemical formula (2), the sum of n and m is an integer selected from a range of 12 or more and 20 or less, and more preferably a range of 14 or more and 18 or less.

$$CH_3(CH_2)_pCOO(CH_2)_qCH_3 \tag{3}$$

Here, in the general chemical formula (3), p is an integer selected from a range of 14 or more and 22 or less, and more preferably a range of 14 or more and 18 or less, and q is an integer selected from a range of 2 or more and 5 or less, and more preferably a range of 2 or more and 4 or less.

$$CH_3(CH_2)_rCOO—(CH_2)_sCH(CH_3)_2 \tag{4}$$

Here, in the general chemical formula (4), r is an integer selected from a range of 14 or more and 22 or less, and s is an integer selected from a range of 1 or more and 3 or less.

$$CH_3(CH_2)_tCOO—(CH)(CH_3)CH_2(CH_3)_u \quad (5)$$

Here, in the general formula (5), t is an integer selected from a range of 14 or more and 22 or less, and u is an integer selected from a range of 1 or more and 3 or less.

Examples of the lubricant include esters of a monobasic fatty acid having 10 to 24 carbon atoms and any of monohydric to hexahydric alcohols having 2 to 12 carbon atoms, mixed esters thereof, di-fatty acid esters, and tri-fatty acid esters, and the like. Specific examples of the lubricant include lauric acid, myristic acid, palmitic acid, stearic acid, behenic acid, oleic acid, linoleic acid, linolenic acid, elaidic acid, butyl stearate, pentyl stearate, heptyl stearate, octyl stearate, isooctyl stearate, octyl myristate, and the like. The magnetic layer may include one or two or more of these.

The content of the lubricant may be, for example, preferably 1 part by mass or more, and more preferably 2 parts by mass or more with respect to 100 parts by mass of the magnetic powder. Furthermore, the content may be, for example, preferably 10 parts by mass or less, more preferably 8 parts by mass or less, and still more preferably 6 parts by mass or less with respect to 100 parts by mass of the magnetic powder.

(Additive)

The magnetic layer 13 may further contain aluminum oxide (α, β, or γ-alumina), chromium oxide, silicon oxide, diamond, garnet, emery, boron nitride, titanium carbide, silicon carbide, titanium carbide, titanium oxide (rutile type or anatase type titanium oxide), or the like, as non-magnetic reinforcing particles.

In an embodiment of the present technology, the magnetic layer may contain first particles having conductivity and second particles having a Mohs hardness of 7 or more. The first particles and the second particles may form protrusions on the magnetic layer side surface. For example, the first particles can prevent an increase in frictional force during traveling of the magnetic recording tape, and for example, exhibit a function as a solid lubricant component. Furthermore, the second particles can exhibit a polishing effect (further, an anchor effect) for cleaning the magnetic head. It is conceivable to contain these two components in a magnetic layer of a magnetic recording tape to improve the traveling performance by preventing an increase in frictional force and cleaning the magnetic head.

The first particles have conductivity. As the first particles, fine particles can be used that contain carbon as a main component, and the fine particles may be, for example, preferably carbon particles. Examples of such carbon particles include carbon black. As the carbon black, for example, Asahi #15 and #15HS manufactured by Asahi Carbon Co., Ltd., SEAST TA manufactured by TOKAI CARBON CO., LTD., and the like can be used. Furthermore, hybrid carbon may be used in which carbon is attached to a silica particle surface.

The average particle size (arithmetic average of particle diameters measured using electron microscopy) of the first particles (in particular, carbon particles such as carbon black) may be, for example, preferably 15 nm or more, more preferably 30 nm or more, and still more preferably 50 nm or more. Furthermore, the average particle size may be, for example, preferably 200 nm or less, more preferably 180 nm or less, still more preferably 150 nm or less, 130 nm or less, or 120 nm or less. The numerical range of the average particle size may be appropriately selected from these upper limits and lower limits, and may be, for example, preferably 50 nm to 200 nm, more preferably 50 nm to 180 nm, still more preferably 50 nm to 150 nm, and even more preferably 50 nm to 130 nm.

The nitrogen adsorption specific surface area of the first particles (in particular, carbon particles such as carbon black) may be, for example, preferably 5 $m^2/g$ to 50 $m^2/g$, and is more preferably 7 $m^2/g$ to 50 $m^2/g$, still more preferably 10 $m^2/g$ to 50 $m^2/g$, and even more preferably 12 $m^2/g$ to 50 $m^2/g$.

The iodine adsorption amount of the first particles (in particular carbon particles, for example carbon black) may be, for example, preferably 5 mg/g to 50 mg/g, more preferably 7 mg/g to 50 mg/g, still more preferably 10 mg/g to 50 mg/g, and even more preferably 12 mg/g to 50 mg/g.

From the viewpoint of suppressing deformation due to contact with the magnetic head, the second particle may have a Mohs hardness of preferably 7 or more, more preferably 7.5 or more, still more preferably 8 or more, and even more preferably 8.5 or more. From the viewpoint of suppressing head wear, the Mohs hardness of the second particles may be, for example, preferably 10 or less, and more preferably 9.5 or less. That is, the second particles may include a material having such a Mohs hardness.

The second particles may be preferably inorganic particles. The second particles may be, for example, α-alumina (the α transformation rate may be, for example, 90% or more), β-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, acicular α-iron oxide obtained by subjecting a raw material of magnetic iron oxide to dehydration and annealing treatment, a product obtained by subjecting the above-described acicular α-iron oxide to surface treatment with aluminum and/or silica as necessary, diamond powder, or a combination of two or more thereof. As the second particles, alumina particles such as α-alumina, β-alumina, γ-alumina, and the like, and silicon carbide are preferably used. These second particles may have any shape such as a needle shape, a spherical shape, a dice shape, and the like, and preferably have a shape including a corner part because, for example, such particles have high abrasivity.

The average particle size (for example, arithmetic average of particle diameters measured using electron microscopy) of the second particles (in particular, inorganic particles such as alumina) may be, for example, preferably 15 nm or more, more preferably 30 nm or more, and still more preferably 50 nm or more. Furthermore, the average particle size may be, for example, preferably 200 nm or less, more preferably 180 nm or less, still more preferably 150 nm or less, 130 nm or less, or 120 nm or less. The numerical range of the average particle size may be appropriately selected from these upper limit and lower limit, and is, for example, preferably 50 nm to 180 nm, more preferably 60 nm to 150 nm, and still more preferably 60 nm to 120 nm.

The second particles (in particular, inorganic particles such as alumina) may have no conductivity. That is, the second particles may be not particles having conductivity like that of the first particles.

(Underlayer)

The underlayer 12 is a non-magnetic layer containing a non-magnetic powder and a binder as main components. The underlayer 12 may further contain at least one additive of another particle, a lubricant, a curing agent, a corrosion inhibitor, or the like, as needed.

(Non-Magnetic Powder)

The non-magnetic powder contained in the underlayer 12 contains, for example, at least one kind of particles selected from inorganic particles and organic particles, and particularly contains at least one kind of particles selected from inorganic particles. One kind of non-magnetic powder may be used alone, or two or more kinds of non-magnetic powders may be used in combination. The non-magnetic inorganic particles may include, for example, one or a combination of two or more selected from metals, metal oxides, metal carbonates, metal sulfates, metal nitrides, metal carbides, and metal sulfides. More specifically, the inorganic particles may be, for example, one or two or more selected from iron oxide, aluminum oxide, carbon black, iron oxyhydroxide, hematite, titanium oxide, silicon oxide, titanium carbide, silicon carbide, diamond, and calcium carbonate. Examples of a shape of the non-magnetic powder include various shapes such as a needle shape, a spherical shape, a cubic shape, a plate shape, and the like, but are not particularly limited thereto.

In an embodiment of the present technology, the non-magnetic powder contains at least iron oxide, particularly acicular iron oxide. In this embodiment, the non-magnetic powder may further contain carbon black and/or aluminum oxide.

The average long axis length of iron oxide (particularly, acicular iron oxide) may be, for example, preferably 0.01 μm or more, more preferably 0.04 μm or more, and still more preferably 0.07 μm or more. Furthermore, the average long axis length may be, for example, preferably 0.5 μm or less, more preferably 0.4 μm or less, and still more preferably 0.3 μm or less.

The average particle diameter of the carbon black may be, for example, preferably 10 nm or more, more preferably 12 nm or more, and still more preferably 15 nm or more. Furthermore, the average particle diameter of the carbon black may be, for example, preferably 250 nm or less, more preferably 150 nm or less, and still more preferably 100 nm or less.

The content of the carbon black may be, for example, preferably 15 parts by mass or more, more preferably 20 parts by mass or more, and still more preferably 25 parts by mass or more with respect to 100 parts by mass of the iron oxide. Furthermore, the content of carbon black may be, for example, preferably 45 parts by mass or less, more preferably 40 parts by mass or less, and still more preferably 35 parts by mass or less with respect to 100 parts by mass of the iron oxide.

The average particle diameter of the aluminum oxide may be, for example, preferably 30 nm or more, more preferably 40 nm or more, and still more preferably 60 nm or more. Furthermore, the average particle diameter of the aluminum oxide may be, for example, preferably 180 nm or less, more preferably 150 nm or less, and still more preferably 120 nm or less.

The content of the aluminum oxide may be, for example, preferably 1 part by mass or more, more preferably 2 parts by mass or more, and still more preferably 3 parts by mass or more with respect to 100 parts by mass of the iron oxide. Furthermore, the content of the aluminum oxide may be, for example, preferably 10 parts by mass or less, more preferably 9 parts by mass or less, and still more preferably 8 parts by mass or less with respect to 100 parts by mass of the iron oxide.

(Binder)

The underlayer contains a binder. The description regarding the binder contained in the magnetic layer 13 also applies to the binder contained in the underlayer 12.

In the present technology, the underlayer contains at least a chlorine-containing binder. The chlorine-containing binder may be a chlorine-containing resin. The chlorine-containing resin is a resin containing a chlorine atom as at least one of elements included in the resin.

The chlorine-containing binder is, for example, a vinyl chloride-based resin. More specific examples of the chlorine-containing binder include polyvinyl chloride, a vinyl chloride-vinyl acetate copolymer, a vinyl chloride-vinylidene chloride copolymer, a vinyl chloride-acrylonitrile copolymer, an acrylic acid ester-vinyl chloride-vinylidene chloride copolymer, an acrylic acid ester-vinylidene chloride copolymer, a methacrylic acid ester-vinylidene chloride copolymer, a methacrylic acid ester-vinyl chloride copolymer, a vinylidene chloride-acrylonitrile copolymer, synthetic rubber, and the like.

The underlayer contains a chlorine-containing binder adsorbed to the non-magnetic powder and a chlorine-containing binder not adsorbed to the non-magnetic powder. The distribution state of the chlorine-containing binder not adsorbed to the non-magnetic powder in the underlayer is affected by the solvent contained in the coating material for forming a magnetic layer and the coating material drying treatment in the step of forming a magnetic layer in the manufacturing process of the magnetic recording medium. The reliability of the magnetic recording medium can be enhanced by controlling the distribution state according to the present technology.

The volume of the chlorine-containing binder contained in the underlayer may be, for example, an amount corresponding to 20 vol % or more, preferably 30 vol % or more, and more preferably 40 vol % or more of the volume of the non-magnetic powder (particularly, the total volume of the non-magnetic powder). Furthermore, the volume may be, for example, an amount corresponding to 180 vol % or less, preferably 170 vol % or less, and more preferably 160 vol % or less of the volume of the non-magnetic powder (particularly, the total volume of the non-magnetic powder).

For example, if the total volume of the non-magnetic powder is 100, the volume of the chlorine-containing binder in the underlayer may be, for example, preferably 20 to 180, more preferably 30 to 170, and still more preferably 40 to 160.

In an embodiment, the underlayer contains iron oxide as the non-magnetic powder. In this embodiment, the content of the chlorine-containing binder in the underlayer may be, for example, preferably 20 parts by mass or more, more preferably 25 parts by mass or more, and still more preferably 30 parts by mass or more with respect to 100 parts by mass of the iron oxide. Furthermore, the content may be, for example, preferably 70 parts by mass or less, more preferably 65 parts by mass or less, and still more preferably 60 parts by mass or less with respect to 100 parts by mass of the iron oxide.

The underlayer may further contain a chlorine-free binder in addition to the chlorine-containing binder. The chlorine-free binder may be a chlorine-free resin. The chlorine-free resin may contain, for example, a polyurethane-based resin. The polyurethane-based resin is a polymer having a urethane bond (—NH—C(═O)—), and may be manufactured by, for example, a polyaddition reaction between an isocyanate compound and a diol compound. The polyurethane-based resin may be, for example, a urethane-modified copolyester. The urethane-modified copolyester may be a urethane-modified copolyester having a basic skeleton of an aromatic polyester and having a side chain containing a urethane component, or a urethane-modified copolyester having a basic skeleton including a repeating unit of an ester and a repeating unit of a urethane.

The volume of the chlorine-free binder contained in the underlayer may be, for example, an amount corresponding to 0 vol % or more, preferably 10 vol % or more, and more preferably 20 vol % or more of the volume of the non-magnetic powder (particularly, the total volume of the non-magnetic powder). Furthermore, the volume may be, for example, an amount corresponding to 150 vol % or less, preferably 140 vol % or less, and more preferably 130 vol % or less of the volume of the non-magnetic powder (particularly, the total volume of the non-magnetic powder). Note that the underlayer may be free of the chlorine-free binder.

For example, if the total volume of the non-magnetic powder is 100, the volume of the chlorine-containing binder in the underlayer may be, for example, preferably 0 to 150, more preferably 10 to 140, and still more preferably 200 to 130.

In an embodiment, the underlayer contains iron oxide as the non-magnetic powder. In this embodiment, the content of the chlorine-free binder in the underlayer may be, for example, preferably 0 parts by mass or more, more preferably 5 parts by mass or more, and still more preferably 10 parts by mass or more with respect to 100 parts by mass of the iron oxide. Furthermore, the content may be, for example, preferably 30 parts by mass or less, more preferably 25 parts by mass or less, and still more preferably 20 parts by mass or less with respect to 100 parts by mass of the iron oxide.

(Lubricant)

The underlayer can contain a lubricant. The lubricant may be, for example, one or two or more selected from fatty acids and/or fatty acid esters, and the lubricant may be preferably a compound represented by the general chemical formula (1) or the general chemical formula (2), or the general chemical formula (3) or the general chemical formula (4) described above for the magnetic layer. One or a plurality of these compounds may be contained.

Examples of the lubricant include esters of a monobasic fatty acid having 10 to 24 carbon atoms and any of monohydric to hexahydric alcohols having 2 to 12 carbon atoms, mixed esters thereof, di-fatty acid esters, and tri-fatty acid esters, and the like. Specific examples of the lubricant include lauric acid, myristic acid, palmitic acid, stearic acid, behenic acid, oleic acid, linoleic acid, linolenic acid, elaidic acid, butyl stearate, pentyl stearate, heptyl stearate, octyl stearate, isooctyl stearate, octyl myristate, and the like. The magnetic layer may include one or two or more of these.

The content of the lubricant in the underlayer may be, for example, preferably 1 part by mass or more, more preferably 1.5 parts by mass or more, and still more preferably 2 parts by mass or more with respect to 100 parts by mass of the nonmagnetic powder (100 parts by mass of the total amount of the non-magnetic powder). Furthermore, the content may be, for example, preferably 12 parts by mass or less, more preferably 10 parts by mass or less, and still more preferably 8 parts by mass or less with respect to 100 parts by mass of the non-magnetic powder (100 parts by mass of the total amount of the non-magnetic powder). The above-described numerical ranges may be applied, for example, in a case where the non-magnetic powder contains iron oxide.

In an embodiment, the underlayer contains iron oxide as the non-magnetic powder. In this embodiment, the content of the lubricant in the underlayer may be, for example, preferably 2 parts by mass or more, more preferably 2.5 parts by mass or more, and still more preferably 3 parts by mass or more with respect to 100 parts by mass of the iron oxide. Furthermore, the content may be, for example, preferably 8 parts by mass or less, more preferably 7 parts by mass or less, and still more preferably 6 parts by mass or less with respect to 100 parts by mass of the iron oxide.

(Back Layer)

The back layer 14 can contain a binding agent and a non-magnetic powder. The back layer 14 may contain various additives such as a lubricant, a curing agent, an antistatic agent, and the like, as needed. The descriptions regarding the binding agent and the non-magnetic powder contained in the above-described non-magnetic layer 12 also apply to the binding agent and the non-magnetic powder contained in the back layer 14.

The average particle size of the inorganic particles contained in the back layer 14 is preferably 10 nm or more and 150 nm or less, and more preferably 15 nm or more and 110 nm or less. The average particle size of the inorganic particles is determined in a manner similar to that for determination of the average particle size D of the magnetic powder described above.

(3) Physical Properties and Structure (Thickness of Part Having Chlorine Count Equal to or More than Threshold in Underlayer)

In the underlayer 12 of the magnetic recording medium 10, the thickness of the part having a chlorine count equal to or more than the threshold described below is, for example, 130 nm or less as described above.

[Threshold]=[an average chlorine count in the underlayer]+6×[a standard deviation determined in calculation of the average chlorine count]

The thickness of the part is the thickness of the region in which the chlorine count determined by measuring the chlorine count in the thickness direction of the underlayer using a scanning transmission electron microscope (STEM) is equal to or more than the above-described threshold.

The method of measuring the thickness of the part is as follows.

(Method of Producing Sample)

In a tape-shaped magnetic recording medium accommodated in a magnetic recording cartridge, a part 20 m from the outermost side in the tape longitudinal direction is used for producing a sample. For example, a magnetic tape T accommodated in a cartridge such as the cartridge 10A described below is unwound, and a part at a position about 20 m from a connection portion 221 between the magnetic tape T and the leader tape LT in the longitudinal direction is used for producing a sample. In this part, a substantially central part in the width direction of the magnetic tape T is cut into an appropriate size (for example, a quadrangle of about 1 mm×about 1 mm) for preparing a sample for STEM observation. A surface of the cut out sample is subjected to a carbon deposition treatment to form a carbon deposition film on the magnetic surface. The sample subjected to the treatment is introduced into a focused-ion beam (FIB) processing apparatus equipped with a scanning electron microscope (SEM). From the sample subjected to the treatment, a fine piece having a size suitable for STEM observation (for example, a quadrangle having sides of 10 μm to 50 μm) is obtained by microsampling with the processing apparatus. The fine piece is fixed to a sample stage of the processing apparatus and then thinned. The thinning is performed so that the thickness of the fine piece in a direction parallel to the magnetic surface is a thickness over which an electron beam used in STEM observation is transmitted. A sample for STEM observation is produced as described above. Note that the apparatus and treatment conditions for producing the sample are as follows.

[Apparatus]

Processing apparatus: Versa3D DualBeam manufactured by FEI Company

[Treatment Conditions]

Sample pretreatment: Carbon deposition

Ion species: Gallium ion

Acceleration voltage (voltage applied during rough excavation): 30 kV

Finishing voltage: 5 kV

Material of sample stage: Mo (Method of Observing Sample)

The sample for STEM observation is observed and subjected to EDX analysis with the following STEM apparatus. Conditions of the observation and the analysis are as follows, and details thereof will be described below.

[Apparatus]

STEM apparatus: Talos F200X (Schottky-FEG) manufactured by FEI Company

EDX system: Super-X manufactured by FEI Company

EDX detector: Four windowless SDD detectors (30 $mm^2$, with a built-in objective lens) manufactured by Bruker

[Observation Conditions]

Acceleration voltage: 200 kV

Acquired image: Bright field (BF) STEM image

High angle annular dark field (HAADF) STEM image

Camera length: 98 mm

Display magnification of Apparatus: 57000 times

[Analysis Conditions (Conditions of Mapping and Line Extraction in EDX Analysis)]

Acceleration voltage: 200 kV

Display magnification of Apparatus: 57000 times

Surface analysis resolution: 800 pixels×700 pixels (1 pixel corresponds to about 2.1 nm.)

Moving average filter: 3 pixels

Data type: Net count

Integrated width of the extracted Kα ray of Cl x length in the thickness direction: 700 pixels×650 pixels Here, the "integrated width of the extracted Kα ray of Cl" is the length of a side substantially parallel to the magnetic surface of the magnetic recording medium in a quadrangle defining the region in which a Kα ray of Cl is extracted.

The "length in the thickness direction" is the length of a side substantially parallel to the thickness direction of the magnetic recording medium in the quadrangle defining the region in which the Kα ray of Cl is extracted.

In this analysis, the net count of a Kα ray of Cl at a certain position in the thickness direction of the magnetic recording medium corresponds to the Cl amount at the certain position. Therefore, the distribution state of the chlorine content can be grasped on the basis of the net count of the Kα ray of Cl. Note that the energy of the Kα ray as the characteristic X-ray generated at the time of irradiating Cl with an electron beam is 2.62 keV.

Figure 3A:
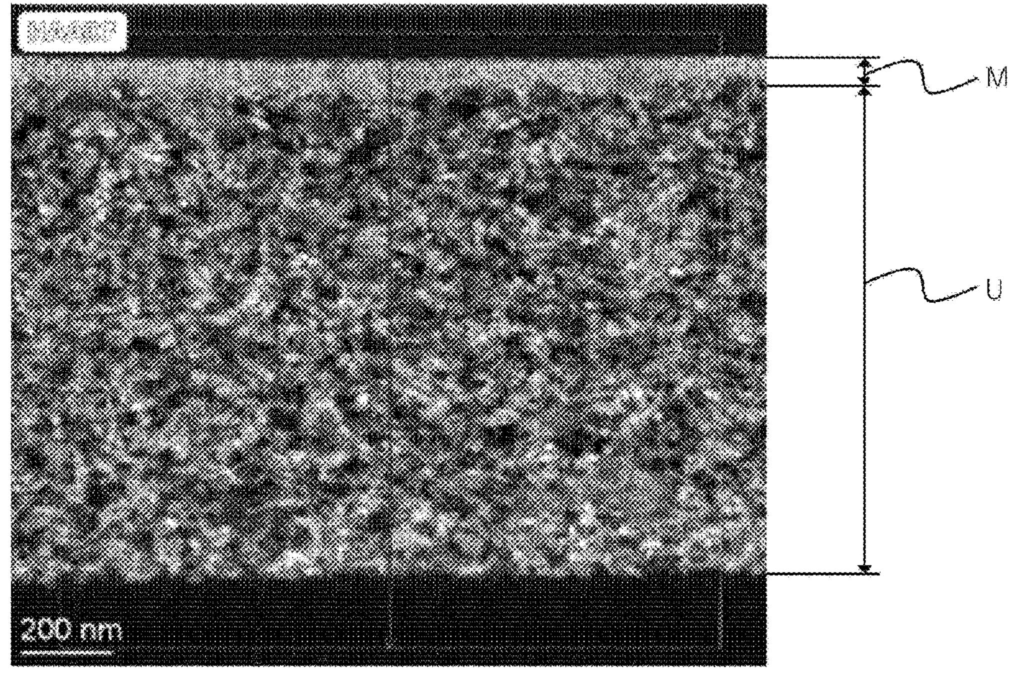
FIG. 3A is a view illustrating an example of a HAADF STEM image.

Under the above-described observation conditions, a HAADF STEM image of the sample for STEM observation in a direction parallel to the magnetic surface is acquired. FIG. 3A illustrates an example of the HAADF STEM image to be acquired. As shown in the same figure, a magnetic layer M and an underlayer U can be recognized from the image.

In this observation, the STEM cross-sectional photo is examined, and it is confirmed that the cross section of the underlayer includes no part having a state clearly different from the normal state of the underlayer. Such a part is, for example, a coarse inorganic particle, a void, a non-dispersion of a binder, or the like, and analysis is performed on a cross section that does not include such a part.

By EDX analysis under the analysis conditions, the distribution state of chlorine atoms at each position in the HAADF image can be identified. Specifically, the identification is performed in the following procedure.

(i) Setting of Chlorine Count Extraction Region in Acquired HAADF STEM Image

Figure 3B:
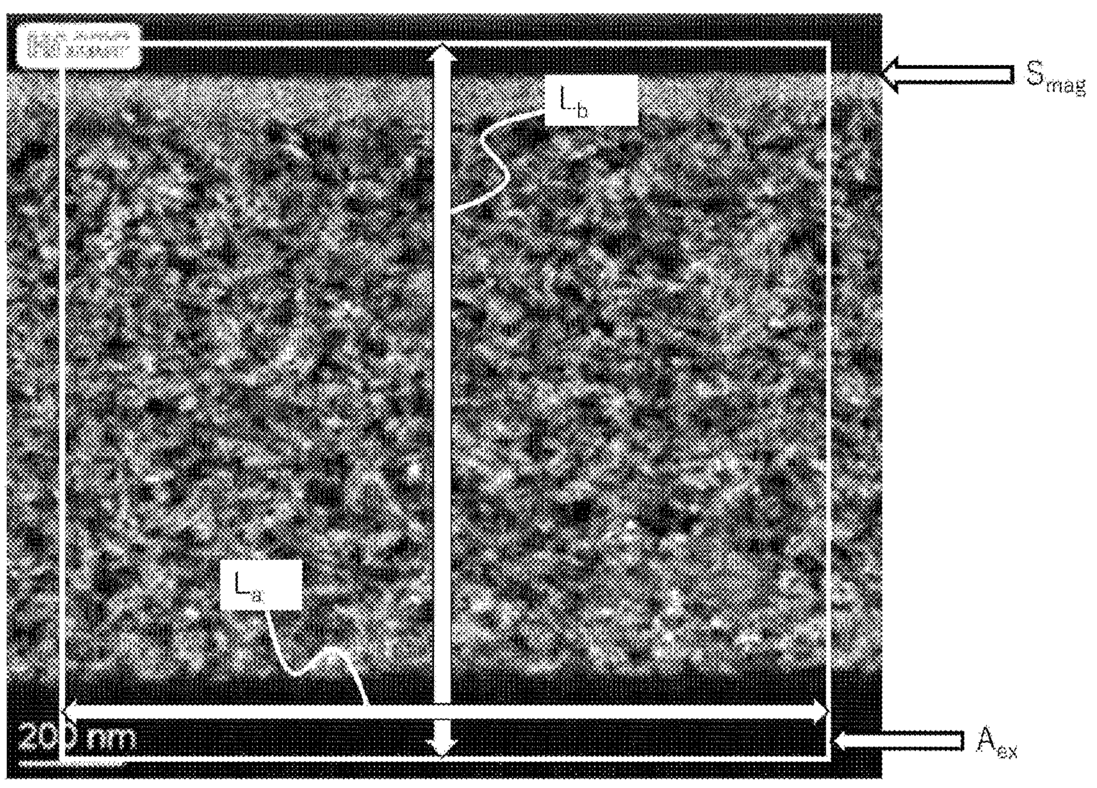
FIG. 3B is a view for explaining a Kα ray extraction region for Cl, set for a HAADF STEM image.

For example, regarding the HAADF image illustrated in FIG. 3A, as illustrated in FIG. 3B, a Kα ray extraction region $A_{ex}$ (a region surrounded by a quadrangle shown by a white line) is set. As shown in the same figure, the Kα ray extraction region is a square or a rectangle, particularly a rectangle.

The length of one side in the lateral direction of the rectangle is 700 pixels, and this is the "integrated width of the extracted Kα ray of Cl" described above, that is, the length of the rectangular area in which the Kα ray of Cl is extracted in a direction substantially parallel to the magnetic surface of the magnetic recording medium. For example, in the same figure, the width indicated by the double arrow $L_a$ is the integrated width of the extracted Kα ray of Cl.

The length of one side in the longitudinal direction of the rectangle is 650 pixels, and this length is the above-described "length in the thickness direction". For example, in the same figure, the length indicated by the double arrow $L_b$ is the length in the thickness direction.

As described above with reference to FIG. 3A, visual observation of the HAADF image enables identification of the magnetic layer and the underlayer. The quadrangle set as the Kα ray extraction region for Cl is set so that the side corresponding to the integrated width of the extracted Kα ray of Cl is substantially parallel to the surface of the visually identified magnetic layer and the quadrangle covers the carbon deposition film, the magnetic layer, the underlayer, and the base layer. Note that in actual setting, a white line as illustrated in the same figure does not need to be drawn.

(ii) Acquirement of Chlorine Distribution Data Based on Result of EDX Analysis Described Above Kα rays of Cl are counted over the entire integrated width of the extracted Kα ray for each pixel position in the thickness direction. In this count, as illustrated in FIG. 3D, a line substantially parallel to the magnetic surface (Line X) is supposed for a certain pixel position X in the thickness direction. Over the entire line, Kα rays of Cl are counted. The total of the counted Kα rays of Cl is the net count.

The net count is calculated for all lines at pixel positions in the thickness direction. In this manner, the net count over the line at each pixel position, that is, the net count at each position in the thickness direction is calculated.

Figure 3C:
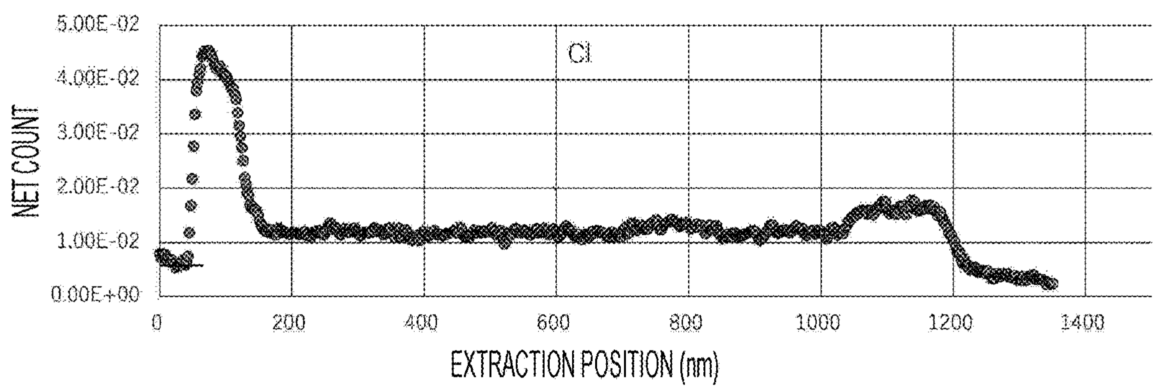
FIG. 3C is a graph showing an example of plot data in which a net count is plotted with respect to a pixel position in the thickness direction.
Figure 3D:
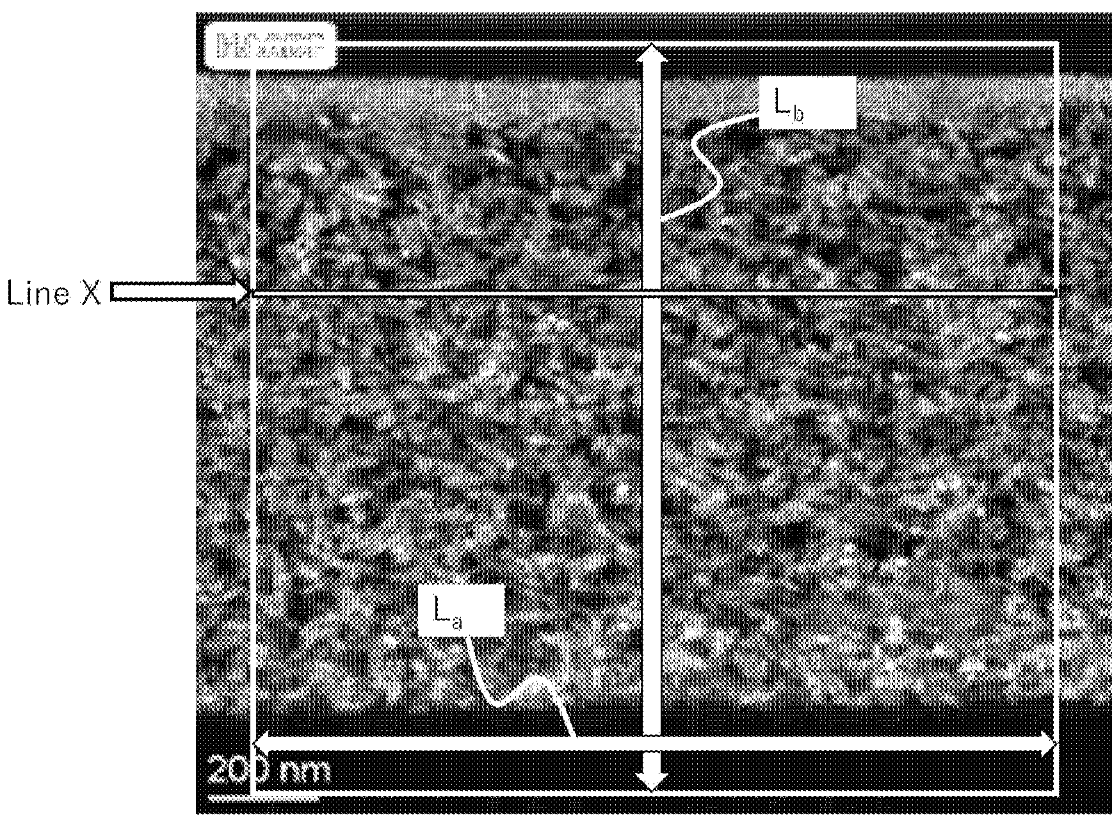
FIG. 3D is a view for explaining a net count. In particular, a view for explaining an example of a line over which Kα rays are counted.

The calculated net counts are plotted with respect to the pixel positions in the thickness direction, and thus, for example, a plot as shown in FIG. 3C is obtained. Note that in the same figure, an "extraction position" on the horizontal axis corresponds to a pixel position in the thickness direction.

(iii) Normalization Processing

The net count data acquired in (ii) described above is subjected to normalization processing. Specifically, the value obtained by summing the acquired net counts over the entire length in the thickness direction (that is, the entire Kα ray extraction region) is normalized to 1. Then, a value obtained by the normalization processing of the net count at each pixel position is regarded as a chlorine count.

(iv) Identification of Magnetic Layer Surface

By utilizing the fact that the carbon deposition film contains no chlorine, the magnetic layer surface in the chlorine count extraction region is identified.

For identification of the magnetic layer surface, first, the part of the carbon deposition film is identified. The part of the carbon deposition film can be roughly identified from the plot. For example, in FIG. 3C, the peak in the left side of the plot corresponds to the magnetic layer part, and therefore the part having a low net count present in the left side of the magnetic layer part is the part of the carbon deposition film. Then, the average (simple average) of the net counts in the first 6 nm part in which the net count starts from 0 is specified as the background value.

Next, in the plot generated in (ii) described above, a position (pixel position in the thickness direction) in which a net count exceeding the background value is recorded is regarded as the position of the magnetic layer surface. For example, in FIG. 3C, rightward from the 0 nm point on the extraction position axis, an extraction position data point is present at which the background value is recorded. The extraction position at the data point on the right of the extraction position data point is the position of the magnetic layer surface.

(v) Calculation of Average Chlorine Count and Standard Deviation in Underlayer

The average and the standard deviation of the chlorine counts (values after the normalization processing in (iii) described above) are calculated in the range of 300 nm to 400 nm in the thickness direction from the magnetic layer surface identified in (iv) described above. The average is a simple average, and the standard deviation is calculated by the n−1 method. The average is the "average chlorine count in the underlayer" in the present description, and the standard deviation is the "standard deviation determined in calculation of the average chlorine count" in the present description.

Figure 3E:
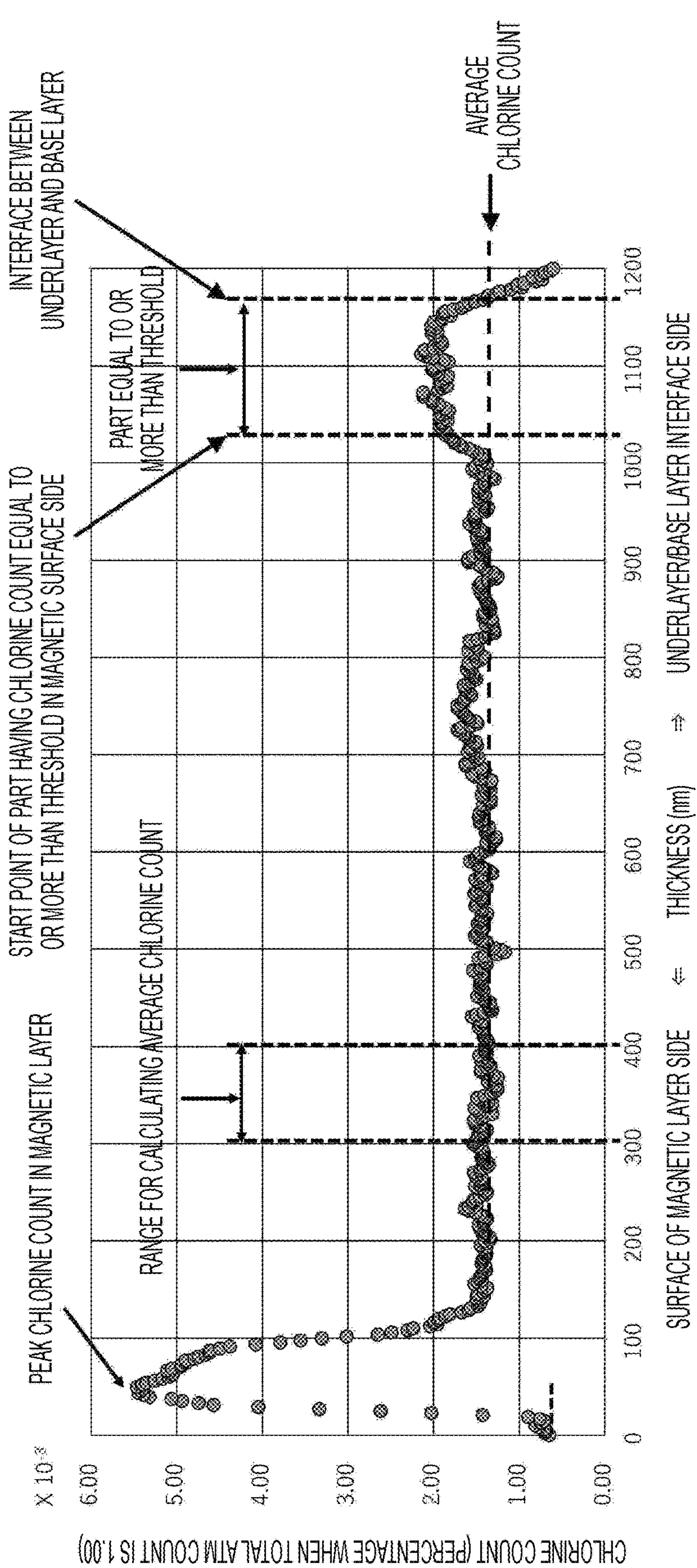
FIG. 3E is a graph showing an example of plot data in which a chlorine count after normalization processing is plotted with respect to a position in the thickness direction.

FIG. 3E shows data obtained by plotting chlorine counts after normalization processing with respect positions in the thickness direction. As shown in the same figure, the range of 300 nm to 400 nm is adopted as a data range in which the average chlorine count and the standard deviation are calculated.

(vi) Calculation of Threshold

The threshold is calculated with the following formula using the "average chlorine count in the underlayer" and the "standard deviation determined in calculation of the average chlorine count" calculated in (v) described above.

[Threshold]=[an average chlorine count in the underlayer]+6×[a standard deviation determined in calculation of the average chlorine count]

(vii) Identification of Thickness of Part Having Chlorine Count Equal to or More than Threshold in Underlayer First, for each pixel position, the moving average of chlorine counts over 10 lines is obtained. The 10 lines include a line at a pixel position as a target for calculation of the moving average, lines at five pixel positions forward from the pixel position as a target to the back layer side, and lines at four pixel positions forward from the pixel position as a target to the magnetic surface side.

In a case where the moving average continues to be equal to or more than the threshold for 6 nm further forward from the average chlorine count calculation range of 300 nm to 400 nm to the base layer side, the first position of the 6 nm is regarded as the "start point of the part having a chlorine count equal to or more than the threshold in the magnetic surface side". An example of the starting point is illustrated in FIG. 3E.

Next, the interface between the underlayer and the base layer is identified. The chlorine count starts to decrease further forward from the start point to the base layer side. Further forward to the base layer side, the first position where the chlorine count becomes lower than the "average chlorine count in the underlayer" is regarded as the "interface between the underlayer and the base layer". FIG. 3E also shows an example of the position of the interface.

Note that in a case where the base layer includes a material containing no chlorine, the position of the interface may be identified as the first position where the chlorine count becomes lower than the average chlorine count in the underlayer as described above. Meanwhile, a case is also assumed in which the base layer includes a material containing chlorine. In this case, if the chlorine count in the base layer is different from the net count of the Kα rays of chlorine in the average part in the underlayer, the position of the interface may be identified on the basis of the difference.

The length from the "start point of the part having a chlorine count equal to or more than the threshold in the magnetic surface side" to the "interface between the underlayer and the base layer" identified as described above is regarded as the "thickness of the part having a chlorine count equal to or more than the threshold in the underlayer". FIG. 3E also shows an example of the part.

(Other Data Obtained on the Basis of the Plot)

The "thickness of the part having a chlorine count equal to or more than the threshold in the underlayer" identified as described above is used to obtain, by the following equation, the ratio of the thickness of the part having a chlorine count equal to or more than the threshold in the underlayer to the thickness of the underlayer.

(Ratio (%) of thickness of part having chlorine count equal to or more than threshold in underlayer to thickness of underlayer)=(thickness of part having chlorine count equal to or more than threshold in underlayer)/(thickness of underlayer)×100

Furthermore, as shown in FIG. 3E, a peak part corresponding to the magnetic layer can be recognized in the left side of the plot in the same figure. The maximum chlorine count in this peak part is the "peak chlorine count in the magnetic layer".

(Average Thickness (Average Total Thickness) $t_T$ of Magnetic Recording Medium)

The average thickness $t_T$ of the magnetic recording medium 10 (hereinafter, also referred to as the magnetic tape T) is determined as follows. First, for example, a magnetic tape T accommodated in a cartridge such as the cartridge 10A described below is unwound, and the magnetic tape T is cut out into a length of 250 mm at a position 30 m from a connection portion 221 between the magnetic tape T and a leader tape LT in the longitudinal direction to prepare a sample. Next, the thickness of the sample is measured at five positions using a laser hologauge (LGH-110C) manufactured by Mitutoyo Corporation as a measuring device, and these measured values are simply averaged (arithmetically averaged) to calculate the average thickness $t_T$ [μm]. Note that the five measurement positions are randomly selected from the sample so as to be different positions in the longitudinal direction of the magnetic tape T.

(Average Thickness of Underlayer (Non-Magnetic Layer))

The average thickness of the underlayer 12 can be determined as follows. First, for example, a magnetic tape T accommodated in a cartridge such as the cartridge 10A described below is unwound, and the magnetic tape T is cut out into a length of 250 mm at each of three positions 10 m, 30 m, and 50 m, respectively, from a connection portion 221 between the magnetic tape T and a leader tape LT in the longitudinal direction to prepare three samples. Subsequently, each sample is processed with a FIB method or the like to perform thinning. In a case where the FIB method is used, formation of a carbon layer and a tungsten layer as protective films is performed as pre-processing for observing a TEM image of a cross section described below. The carbon layer is formed on a magnetic layer 13 side surface and a back layer 14 side surface of the magnetic tape T with a vapor deposition method, and then the tungsten layer is further formed on the magnetic layer 13 side surface with a vapor deposition method or a sputtering method. The thinning is performed in the longitudinal direction of the magnetic tape T. That is, a cross section parallel to both the longitudinal direction and the thickness direction of the magnetic tape T is formed by the thinning.

The obtained cross section of each thinned sample is observed with a transmission electron microscope (TEM) under the following conditions.

Apparatus: TEM (H9000NAR manufactured by Hitachi, Ltd.)

Acceleration voltage: 300 kV

Magnification: 100,000 times

Next, the thickness of the underlayer 12 is measured at least 10 positions in the longitudinal direction of the magnetic tape T using the obtained TEM image, and then these measured values are simply averaged (arithmetically averaged) to obtain the average thickness (nm) of the underlayer 12.

(Average Thickness of Base Layer)

The average thickness of the base layer 11 can be determined as follows. First, for example, a magnetic tape T accommodated in a cartridge such as the magnetic recording cartridge 10A described below is unwound, and the magnetic tape T is cut out in a length of 250 mm at a position 30 m from a connection portion 221 between the magnetic tape T and a leader tape LT in the longitudinal direction to prepare a sample. In the present description, the "longitudinal direction" in the case of "longitudinal direction from a connection portion between a magnetic tape T and a leader tape LT" means a direction from one end on the leader tape LT side toward the other end on the opposite side.

Subsequently, layers other than the base layer 11 of the sample (that is, the non-magnetic layer (underlayer) 12, the magnetic layer 13, and the back layer 14) are removed with a solvent such as methyl ethyl ketone (MEK), dilute hydrochloric acid, or the like. Next, the thickness of the sample (base layer 11) is measured at five positions using a laser hologauge (LGH-110C) manufactured by Mitutoyo Corporation as a measuring device, and these measured values are simply averaged (arithmetically averaged) to calculate the average thickness of the base layer 11. Note that the five measurement positions are randomly selected from the sample so as to be different positions in the longitudinal direction of the magnetic tape T.

(Average Thickness $t_b$ of Back Layer)

The average thickness $t_b$ of the back layer 14 is determined as follows. First, the average thickness (average total thickness) $t_T$ of the magnetic tape T is measured. The method of measuring the average thickness $t_T$ (average total thickness) is as described above. Subsequently, the magnetic tape T accommodated in the cartridge 10A is unwound, and the magnetic tape T is cut out into a length of 250 mm at a position 30 m from the connection portion 221 between the magnetic tape T and the leader tape LT in the longitudinal direction to prepare a sample. Next, the back layer 14 of the sample is removed with a solvent such as methyl ethyl ketone (MEK), dilute hydrochloric acid and the like. Next, the thickness of the sample is measured at five positions using a laser hologauge (LGH-110C) manufactured by Mitutoyo Corporation, and these measured values are simply averaged (arithmetically averaged) to calculate the average $t_B$ [μm]. Thereafter, the average thickness $t_b$ [μm] of the back layer 14 is determined with the following formula. Note that the five measurement positions are randomly selected from the sample so as to be different positions in the longitudinal direction of the magnetic tape T.

$$t_b\,[\mu m]=t_T\,[\mu m]-t_B\,[\mu m]$$

(Average Thickness $t_m$ of Magnetic Layer)

The average thickness $t_m$ of the magnetic layer 13 is determined as follows. First, the magnetic tape T accommodated in the cartridge 10A is unwound, and the magnetic tape T is cut out into a length of 250 mm at each of three positions 10 m, 30 m, and 50 m, respectively, from the connection portion 221 between the magnetic tape T and the leader tape LT in the longitudinal direction to prepare three samples. Subsequently, each sample is processed with a FIB method or the like to perform thinning. In a case where the FIB method is used, formation of a carbon layer and a tungsten layer as protective films is performed as pre-processing for observing a TEM image of a cross section described below. The carbon layer is formed on a magnetic layer 13 side surface and a back layer 14 side surface of the magnetic tape T with a vapor deposition method, and then the tungsten layer is further formed on the magnetic layer 13 side surface with a vapor deposition method or a sputtering method. The thinning is performed in the longitudinal direction of the magnetic tape T. That is, a cross section parallel to both the longitudinal direction and the thickness direction of the magnetic tape T is formed by the thinning.

The obtained cross section of each thinned sample is observed with a transmission electron microscope (TEM) under the following conditions, and thus a TEM image of each thinned sample is obtained. Note that the magnification and the acceleration voltage may be appropriately adjusted according to the type of the apparatus.

Apparatus: TEM (H9000NAR manufactured by Hitachi, Ltd.)

Acceleration voltage: 300 kV

Magnification: 100,000 times

Next, the thickness of the magnetic layer 13 is measured at 10 positions of each thinned sample using the obtained TEM image of each thinned sample. Note that the 10 measurement positions of each thinned sample are randomly selected from the sample so as to be different positions in the longitudinal direction of the magnetic tape T. The average obtained by simply averaging (arithmetically averaging) the obtained measured values of the thinned samples (the thicknesses of the magnetic layer 13 at 30 points in total) is regarded as the average thickness $t_m$ [nm] of the magnetic layer 13.

(Core Portion Level Difference Rk in Bearing Curve)

In the magnetic recording medium 10, in a bearing curve created on the basis of height data of a magnetic layer side surface acquired using an atomic force microscope, a core portion level difference Rk is 5.5 nm or less, preferably 5.2 nm or less, more preferably 5.0 nm or less, and even more preferably 4.7 nm or less. If the core portion level difference Rk is within this numerical range, resolution can be improved. The core portion level difference Rk may be, for example, 3.6 nm or more or 3.8 nm or more.

The core portion level difference Rk is obtained from a bearing curve created on the basis of height data of the magnetic layer side surface of the magnetic recording medium 10 acquired using an atomic force microscope. Hereinafter, first, a method of creating a bearing curve will be described, and next, a method of calculating the core portion level difference Rk will be described.

(Bearing Curve)

The bearing curve described above is created as follows. First, the uneven shape of the magnetic layer side surface of the magnetic recording medium 10 is measured by an atomic force microscope (AFM). The measurement is performed at 256×256 (65,536) measurement points in a range of 40 μm×40 μm.

AFM suitable for measurement will be described below.

AFM: Dimension 3100 manufactured by Digital Instruments

Cantilever: NCH-10T manufactured by NanoWorld Measurement conditions of AFM will be described below.

Measurement area: 40 μm×40 μm

Resolution: 256×256

Scan direction of the probe of the AFM: MD direction (longitudinal direction) of the magnetic tape Measurement mode: Tapping mode Scan ratio: 1 Hz Next, the data obtained by the measurement is displayed with a binary editor (Binary Editor Bz), and the value of Sens.Zscan [nm/V] and the value of Z_Scale [V], and the measured value $pAFM_{a,b}$ of each measurement point are extracted from the data. The obtained values of Sens.Zscan and Z_Scale are loaded into a program LabVIEW manufactured by National Instruments, the matrix is inverted, and excess data of 2 bits is deleted. The value obtained from LabVIEW is loaded into the calculation program. The value of coordinates for drawing the bearing curve is obtained by the calculation program. The flow of calculation in the calculation program is as follows.

First, the height $AFM_{a,b}$ of each measurement point is obtained by the following equation.

[Mathematical Formula 2]

$$AFM_{a,b}[\text{nm}] = \frac{pAFM_{a,b} \times Sens.Zscan[\text{nm/V}] \times \text{Z\_scale[V]}}{65536}.$$

(In the equation, $AFM_{a,b}$ described above is the height of each measurement point, $pAFM_{a,b}$ is the measured value of each measurement point, and a and b are each independently an integer selected from a range of 1 or more and 256 or less.)

The position of each measurement point in the range of 40 μm×40 μm is specified by the values of a and b in the equation.

In the magnetic recording medium of the present technology, the "height data of the magnetic layer side surface acquired using an atomic force microscope" described above (hereinafter, also simply referred to as "height data of the magnetic layer side surface") means the heights $AFM_{a,b}$ of each measurement point obtained by the formula.

Next, a bearing curve is created on the basis of the height data of the magnetic layer side surface described above. Specifically, first, an average (average height $H_a$) of the heights $AFM_{a,b}$ of the measurement points obtained by the formula is calculated. Next, the height difference $H_d$ of each measurement point is calculated by subtracting the value of the average height $H_a$ from the values of the height $AFM_{a,b}$ of each measurement point. That is, the height difference $H_d$ of each measurement point is obtained by the following equation.

Height difference $H_d$ [nm]=(height $AFM_{a,b}$ of each measurement point)−(average height $H_a$) at each measurement point The height differences $H_d$ of the measurement points are arranged as a one-dimensional array. The one-dimensional array is sorted in descending order of values (descending order). $H_d$ of the one-dimensional array after the sorting is the value of the Y coordinate of each point drawing the bearing curve. That is, the value of the Y coordinate of the bearing curve is the height difference $H_d$. In the present specification, the height difference $H_d$ is referred to as a height in the bearing curve.

Next, the value of the X coordinate of each point drawing the bearing curve is obtained by the following equation.

Value of $X$ coordinate [%]=Data Number/total number of data×100

(In the above equation, Data Number is an element number of the one-dimensional array after sorting in descending order, and the total number of data is the number of all measurement points.)

Figures 4, 5:
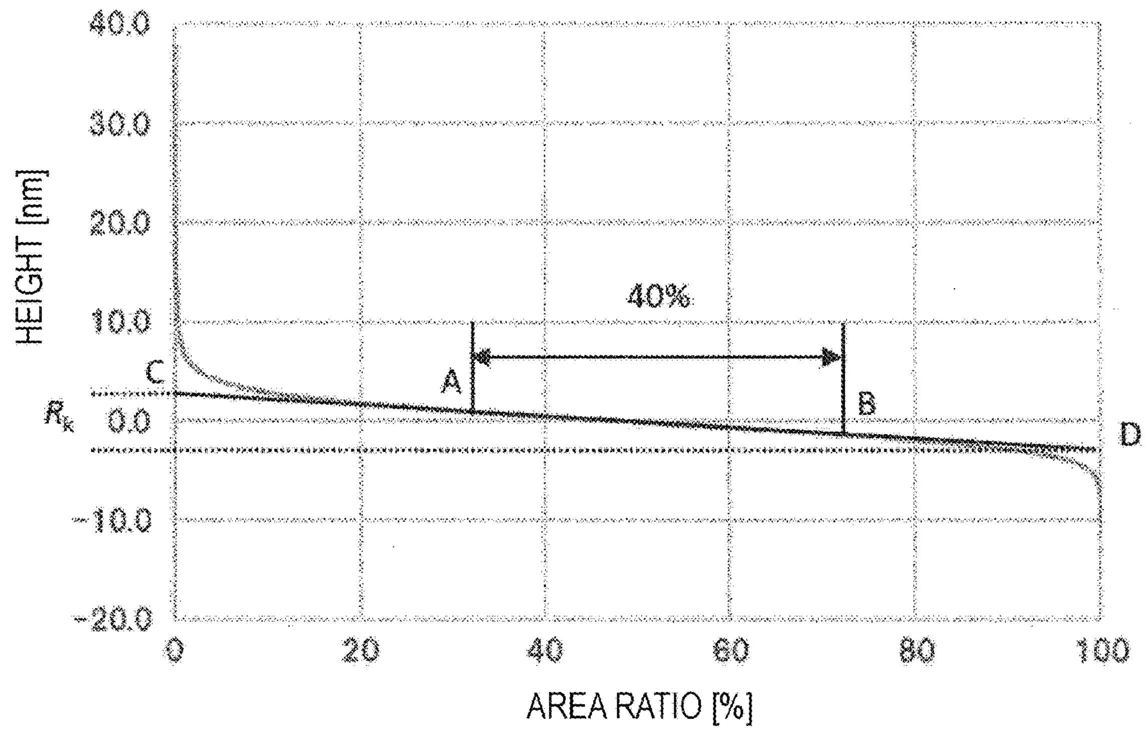
FIG. 4 is a diagram illustrating an example of a result of a calculation program.
FIG. 5 is a graph illustrating an example of a bearing curve.

As described above, the value of the X coordinate and the value of the Y coordinate are obtained by the calculation program. FIG. 4 shows an example of Data Number, a value of the X coordinate, and a value of the Y coordinate obtained by the calculation program.

Finally, a bearing curve is created by plotting the obtained value of the X coordinate and the obtained value of the Y coordinate on the XY coordinate. In the XY coordinates, the X axis indicates the area ratio, and the Y axis indicates the height (specifically, the height difference $H_d$). The area ratio is a cumulative ratio of the height (height difference $H_d$). That is, the area ratio is expressed as a percentage in which the frequency is accumulated in descending order of height (height difference $H_d$), and the number (65,536) of all measurement points measured by AFM is set to 100. For example, in a case where the X coordinate of the point P on the bearing curve is 10(%) and the Y coordinate is 2.50 (nm), the number of measurement points whose height (height difference $H_d$) is 2.50 nm or more is 10% of the number of all measurement points.

(Core Portion Level Difference Rk)

A method of calculating the core portion level difference Rk will be described with reference to FIG. 5. FIG. 5 is a graph illustrating an example of a bearing curve. First, among straight lines passing through two points (point A, point B) where the difference in area ratio is 40% at points on the bearing curve, a straight line having the smallest inclination is obtained. Next, an intersection of the straight line having the smallest inclination and the area ratio of 0% is defined as a point C. An intersection of the straight line having the smallest inclination and the area ratio of 100% is defined as a point D. Finally, an absolute value of a difference between the Y coordinate of the point C and the Y coordinate of the point D is calculated. The absolute value of the difference is the core portion level difference Rk.

(Height of Bearing Curve at Specific Area Ratio)

The height of the magnetic recording medium 10 at an area ratio of 10.00% of the bearing curve is preferably 2.80 nm or less, more preferably 2.50 nm or less, and even more preferably 2.30 nm or less. The fact that the height at the area ratio of 10.00% is within this numerical range can contribute to improvement of resolution. The height at the area ratio of 10.00% may be, for example, 1.50 nm or more or 1.80 nm or more.

The height H at an area ratio of 20.00% of the bearing curve of the magnetic recording medium 10 is preferably 1.70 nm or less, more preferably 1.60 nm or less, and even more preferably 1.50 nm or less. The fact that the height at the area ratio of 20.00% is within this numerical range can contribute to improvement of resolution. The height at the area ratio of 20.00% may be, for example, 0.90 nm or more or 1.10 nm or more.

The height of the magnetic recording medium 10 at an area ratio of 30.00% of the bearing curve is preferably 1.00 nm or less, and more preferably 0.90 nm or less. The fact that the height at the area ratio of 30.00% is within this numerical range can contribute to improvement of resolution. The height at the area ratio of 30.00% may be, for example, 0.40 nm or more or 0.60 nm or more.

The height of the magnetic recording medium 10 at an area ratio of 40.00% of the bearing curve is preferably 0.50 nm or less, and more preferably 0.40 nm or less. The fact that the height at the area ratio of 40.00% is within this numerical range can contribute to improvement of resolution. The height at the area ratio of 40.00% may be, for example, 0.10 nm or more or 0.20 nm or more.

The inventor has found that the height at each area ratio of 10.00%, 20.00%, 30.00%, and 40.00% of the bearing curve has a high correlation with the resolution. As a result of further studies, the present inventor has found that a magnetic recording medium exhibiting higher resolution can be obtained when the height at a specific area ratio is equal to or less than a specific numerical value as described above. This is presumed to be because reducing the height value at a specific area ratio contributes to reducing the unevenness of the magnetic layer side surface of the magnetic recording medium.

(Power Spectrum Density)

The power spectrum density (PSD) of the magnetic layer up to a spatial wavelength of 5 μm can be used as an index of undulation of the surface of the magnetic layer. In the magnetic recording medium 10, the power spectrum density of the magnetic layer 13 up to a spatial wavelength of 5 μm is preferably 3.6 $nm^3$ or less, more preferably 3.3 $nm^3$ or less, even more preferably 3.0 $nm^3$ or less, and particularly preferably 2.6 $nm^3$ or less. The power spectrum density within this numerical range can contribute to improvement of resolution. This is considered to be because the spacing can be reduced by the power spectrum density falling within the numerical range (for example, 3.6 $nm^3$ or less)

The power spectrum density of the magnetic layer 13 up to a spatial wavelength of 5 μm is measured as follows. First, the magnetic recording medium 10 having a width of 12.7 mm is cut into a length of 10 mm to prepare a rectangular sample of 12.7 mm×10 mm. Furthermore, samples having the same shape are prepared at 2 locations every 10 m to obtain a total of 3 samples. Each sample is fixed on a glass slide using a carbon tape or the like. The surface is observed with an atomic force microscope (AFM) to obtain two-dimensional (2D) surface profile data.

AFM suitable for measurement will be described below.

AFM: Dimension 3100 manufactured by Digital Instruments

Cantilever: NCH-10T manufactured by NanoWorld Measurement conditions of AFM will be described below.

Measurement area: 40 μm×40 μm

Resolution: 256×256

Scan direction of the probe of the AFM: MD direction (longitudinal direction) of the magnetic tape Measurement mode: Tapping mode Scan ratio: 1 Hz Next, the following filter processing is performed on the 2D surface profile data obtained by AFM.

Flatten: Second order

Planefit: Third order in MD direction and TD direction (width direction)

Next, fast Fourier transform (FFT) is performed in each of 256 lines in the MD direction of the 2D surface profile data after the filter processing to acquire 256 PSDs. Next, the acquired 256 PSDs in the MD direction are averaged for each wavelength, and one averaged PSD in the MD direction (hereinafter referred to as "$PSD_{MD}$" or "$PSD(k)_{MD}$") is obtained. Note that the following equation is used for averaging the PSD in the MD direction.

[Mathematical Formula 3]

$$PSD(k)_{MD} = \left( \frac{2d}{N} \left| \sum_{n=0}^{N-1} Z(n) \cdot e^{\left(\frac{2\pi ikn}{N}\right)} \right|^2 \right)_{average}$$

PSD: Power spectrum density ($nm^3$)

z (n): Surface profile data (nm) at the n-th point d: Resolution (nm)=L/N

L: Measurement range (40 μm) in X-axis direction (or Y-axis direction)

N: Number of points in X-axis direction (256 points)

i: Imaginary unit e: Napier's number average: Averaging operation in Y-axis direction (or X-axis direction)

n: Variable (0 to N−1)

k: Wavenumber (0 to N−1)

Note that the X-axis direction corresponds to the MD direction (longitudinal direction).

Among the PSD values at the respective wavelengths obtained so far, PSD values at a wavelength of 5 μm or less are integrated. A simple average (arithmetic average) of the integrated values of the three samples is adopted as the power spectrum density up to the spatial wavelength of 5 μm of the magnetic layer 13.

(Resolution)

The magnetic recording medium 10 includes a magnetic layer and an underlayer, and in a bearing curve created on the basis of height data of a magnetic layer side surface acquired using an atomic force microscope, a core portion level difference Rk is 5.5 nm or less, and an average thickness of the underlayer is 1100 nm or less. Therefore, the magnetic recording medium 10 exhibits high resolution. Therefore, the magnetic recording medium 10 can increase the output at the time of short wavelength recording to approach the output at the time of long-wavelength recording.

The resolution described above means the tape ratio of Example 1 of the ratio of the output at the time of short wavelength recording to the output at the time of long-wavelength recording. Hereinafter, a method for calculating the resolution will be described.

In measuring the reproduction output necessary for calculating the resolution, the following apparatus is used in addition to the magnetic recording medium (hereinafter, also referred to as a test tape) for evaluating the resolution.

Apparatus: an LTO9 Full Hight drive, or a recording and reproducing system capable of measuring under the following measurement conditions (the following head and tape speed)

Head: LTO9-specification Write Read Head

Head speed: 1.85 m/s

First, recording is performed on the test tape and the tape of Example 1 at the following frequencies using a function generator.

| Recording frequency: | TRD1→2.5 [MHz]<br>TRD3→10 [MHz] |
|---|---|

The recording current is a current that maximizes the output at the time of 10 MHz recording.

Next, each of the test tape and the tape of Example 1 is scanned 16 times or more using a loop tester (manufactured by Microphysics) to acquire a reproduction signal.

Reproduction Signal Acquisition Condition

Head: LTO9-specification Write Read Head

Head speed: 1.85 m/s

Signal: Single recording frequency (10 MHz, 2.5 MHz)

Recording current: Optimum recording current at the time of 10 MHz recording

The reproduction signal is captured by a spectrum analyzer under the following conditions.

Reproduction Signal Capture Conditions

SPAN: 0 to 20 MHz (Resolution band width=100 kHz, VBW=30 kHz)

Next, the peak (peak-to-peak value) of the captured spectrum (reproduction waveform) is defined as a signal amount S, and the obtained signal amount S is averaged (arithmetically averaged). Therefore, the signal amount S of each of the test tape and the tape of Example 1 is calculated.

Resolution is obtained by the following equation.

$$\text{Resolution [\%]}=(\text{signal amount } S \text{ of } TRD1 \text{ of test tape/signal amount } S \text{ of } TRD3 \text{ of test tape})/(\text{signal amount } S \text{ of } TRD1 \text{ of tape of Example 1/signal amount } S \text{ of } TRD3 \text{ of tape of Example 1})\times 100$$

The resolution of the magnetic recording medium of the present technology is, for example, preferably 90.0% or more, 92.0% or more, more preferably 94.0% or more, even more preferably 97.0% or more, and particularly preferably 100.0% or more. The fact that the resolution is within this numerical range contributes to bringing the output at the time of short wavelength recording closer to the output at the time of long wavelength recording.

(Squareness Ratio Rs1 in Longitudinal Direction)

The squareness ratio Rs1 measured in the longitudinal direction of the magnetic tape T is preferably 35% or less, more preferably 30% or less, even more preferably 25% or less, particularly preferably 20% or less, and most preferably 15% or less. If the squareness ratio Rs1 is 35% or less, the vertical orientation of the magnetic powder is sufficiently high, so that a more excellent SNR can be obtained. Therefore, a more excellent electromagnetic conversion characteristic can be obtained. Furthermore, the servo signal shape is improved, and control on the drive side is more easily performed.

The squareness ratio Rs1 of the magnetic tape in the longitudinal direction is determined as follows. First, the magnetic tape accommodated in the cartridge is unwound, and six magnetic tapes are cut out at positions of 30 m to 40 m in the longitudinal direction from one end on the outer peripheral side of the magnetic tape. At this time, marking is performed with an arbitrary ink having no magnetism so that the longitudinal direction (traveling direction) of the magnetic tape can be recognized. Next, the three cut magnetic tapes are stacked with a double-sided tape such that the longitudinal directions of the three magnetic tapes are the same, and then punched out with a p 6.39 mm punch to prepare a measurement sample. Next, the M-H loop of the measurement sample (the entire magnetic tape) corresponding to the longitudinal direction of the magnetic tape (the longitudinal direction of the magnetic tape) is measured using a vibrating sample magnetometer (VSM). Next, the coating films (underlayer, magnetic layer, back layer, and the like) of the remaining three magnetic tapes that have been cut out are wiped off using acetone, ethanol, and the like, leaving only the base layer. Then, the obtained three base layers are stacked with a double-sided tape, and then punched with a y 6.39 mm punch to prepare a sample for background correction (hereinafter, simply referred to as "sample for correction"). Thereafter, the M-H loop of the sample for correction (base layer) corresponding to the longitudinal direction of the base layer (longitudinal direction of the magnetic tape) is measured using the VSM.

In the measurement of the M-H loop of the measurement sample (the entire magnetic tape) and the M-H loop of the sample for correction (base layer), a high-sensitivity vibrating sample magnetometer "model VSM-P7-15" manufactured by Toei Industry Co., Ltd. is used. The measurement conditions are as follows: measurement mode: full loop, maximum magnetic field: 15 kOe, magnetic field step: 40 bits, time constant of locking amp: 0.3 sec, waiting time: 1 sec, and MH average number: 20.

After obtaining the M-H loop of the measurement sample (the entire magnetic tape) and the M-H loop of the sample for correction (base layer), the M-H loop of the sample for correction (base layer) is subtracted from the M-H loop of the measurement sample (the entire magnetic tape) to perform background correction, and an M-H loop after background correction is obtained. For calculation of the background correction, a measurement/analysis program attached to "model VSM-P7-15" is used. Note that it is assumed that every measurement of the M-H loop described above is performed at 25° C.±2° C. and 50% RH±5% RH. Furthermore, it is assumed that "demagnetizing field correction" when measuring the M-H loop in the longitudinal direction of the magnetic tape is not performed. Furthermore, the M-H loop may be measured by stacking a plurality of samples to be measured according to the sensitivity of the VSM to be used.

The squareness ratio Rs1(%) is calculated by substituting saturation magnetization Ms (emu) and residual magnetization Mr (emu) of the obtained M-H loop after the background correction into the following equation. Note that for this calculation, a measurement/analysis program attached to "model VSM-P7-15" is used.

$$\text{Squareness ratio } Rs1(\%)=(Mr/Ms)\times 100$$

(4) Method of Manufacturing Magnetic Recording Medium

Next, a method of manufacturing the magnetic recording medium 10 having the above-described configuration will be described. First, a non-magnetic powder, a binding agent, and the like are kneaded and/or dispersed in a solvent to prepare a coating material for forming an underlayer (non-magnetic layer). Next, a magnetic powder, non-magnetic particles, a binding agent, and the like are kneaded and/or dispersed in a solvent to prepare a coating material for forming a magnetic layer. For the preparation of the coating material for forming a magnetic layer and the coating material for forming an underlayer (non-magnetic layer), for example, the following solvents, dispersing apparatus, and kneading apparatus can be used.

Examples of the solvent used in the preparation of the coating material described above include ketone-based solvents such as acetone, methyl ethyl ketone, methyl isobutyl ketone, cyclohexanone, and the like, alcohol-based solvents such as methanol, ethanol, propanol, and the like, ester-based solvents such as methyl acetate, ethyl acetate, butyl acetate, propyl acetate, ethyl lactate, ethylene glycol acetate, and the like, ether-based solvents such as diethylene glycol dimethyl ether, 2-ethoxyethanol, tetrahydrofuran, dioxane, and the like, aromatic hydrocarbon-based solvents such as benzene, toluene, xylene, and the like, and halogenated hydrocarbon-based solvents such as methylene chloride, ethylene chloride, carbon tetrachloride, chloroform, chlorobenzene, and the like. One of these solvents may be used, or a mixture of two or more thereof may be used.

As the kneading apparatus used in the preparation of the coating material described above, for example, a kneading apparatus can be used such as a continuous biaxial kneader, a continuous biaxial kneader capable of diluting in multiple steps, a kneader, a press kneader, a roll kneader, or the like, but the kneading apparatus is not particularly limited thereto. Furthermore, as the dispersing apparatus used in the preparation of the coating material described above, for example, a dispersing apparatus can be used such as a bead mill, a roll mill, a ball mill, a horizontal sand mill, a vertical sand mill, a spike mill, a pin mill, a tower mill, a pearl mill (for example, "DCP Mill" manufactured by Nippon Eirich Co., Ltd., or the like), a homogenizer, an ultrasonic dispersing apparatus, or the like, but the dispersing apparatus is not particularly limited thereto.

Next, the coating material for forming an underlayer is applied to one principal surface of a base layer 11 and dried to form an underlayer 12. Subsequently, the coating material for forming a magnetic layer is applied onto the underlayer 12 and dried to form a magnetic layer 13 on the non-magnetic layer 12.

The thickness and/or the position of the part having a chlorine count equal to or more than the threshold described below can be adjusted with a method of forming the magnetic layer and/or the underlayer and/or by adjusting the composition of the coating material for forming a magnetic layer and/or the coating material for forming an underlayer.

For example, the thickness and/or the position of the part having a chlorine count equal to or more than the threshold described below can be adjusted, for example, by adjusting the drying temperature of the coating material for forming a magnetic layer and/or the coating material for forming an underlayer. For example, the thickness is further increased by lowering the drying temperature. Meanwhile, if the drying temperature is raised, the part can be present in the base layer side and the thickness can be further decreased.

Furthermore, the thickness and/or the position of the part can be adjusted by modifying the non-magnetic powder contained in the coating material for forming an underlayer with a surface modifier. For example, the amount of the binder adsorbed to the non-magnetic powder can be adjusted by modification with a surface modifier. Examples of the modifier include polycarboxylic acids. If the amount of the binder adsorbed is increased, the thickness can be further decreased.

Furthermore, the thickness and/or the position of the part can be adjusted by adjusting the time from the drying of the coating material for forming an underlayer to the application of the coating material for forming a magnetic layer. For example, if the time is longer, the binder is less likely to move in the underlayer at the time of applying the coating material for forming a magnetic layer and the thickness is further increased. Meanwhile, if the time is shorter, the binder easily moves in the underlayer at the time of applying the coating material for forming a magnetic layer, the part can be present in the base layer side, and the thickness can be further decreased.

Furthermore, the thickness of the part can also be adjusted by the solid content concentration of the coating material for forming a magnetic layer and/or the coating material for forming an underlayer. For example, if the solid content concentration of the coating material for forming a magnetic layer is high, the amount of the solvent that permeates the underlayer is decreased at the time of applying the coating material for forming a magnetic layer, and the thickness of the part is increased. Meanwhile, if the solid content concentration is low, the thickness of the part is decreased.

Furthermore, the thickness of the part can also be adjusted by the ratio between the non-magnetic powder and the binder in the coating material for forming an underlayer. For example, if the amount of the binder is increased, the binder not adsorbed to the non-magnetic powder is increased and thus the thickness of the part is further increased. Meanwhile, if the amount of the binder is decreased, the thickness of the part can be further decreased.

Note that, at the time of drying, the magnetic powder is magnetically oriented in the thickness direction of the base layer 11 with, for example, a solenoid coil. Furthermore, at the time of drying, for example, the magnetic powder may be magnetically oriented in the longitudinal direction (traveling direction) of the base layer 11 and then magnetically oriented in the thickness direction of the base layer 11 with a solenoid coil. The ratio Hc2/Hc1 of the holding force "Hc2" in the longitudinal direction to the holding force "Hc1" in the vertical direction can be reduced, and the degree of vertical orientation of the magnetic powder can be improved by performing such magnetic orientation processing. After forming the magnetic layer 13, a back layer 14 is formed on the other principal surface of the base layer 11. Thus, a magnetic recording medium 10 is obtained.

The ratio Hc2/Hc1 is, for example, set to a desired value by adjusting the strength of the magnetic field applied to the coating film of the coating material for forming a magnetic layer, the solid content concentration in the coating material for forming a magnetic layer, and drying conditions of the coating film of the coating material for forming a magnetic layer (the drying temperature and the drying time). The strength of the magnetic field applied to the coating film is preferably 2 times or more and 3 times or less the holding force of the magnetic powder. In order to further increase the ratio Hc2/Hc1, it is also preferable to magnetize the magnetic powder at a stage before the coating material for forming a magnetic layer is put in an orienting apparatus for magnetically orienting the magnetic powder. Note that methods of adjusting the ratio Hc2/Hc1 may be used alone or in combination of two or more thereof.

Thereafter, the obtained magnetic recording medium 10 is rewound around a large-diameter core, and curing treatment is performed. Finally, the magnetic recording medium 10 is calendered and then cut into a predetermined width (for example, a width of ½ inches). Thus, a target elongated magnetic recording medium 10 is obtained.

(5) Recording and Reproducing Apparatus

[Configuration of Recording and Reproducing Apparatus]

Next, an example of a configuration of a recording and reproducing apparatus 30 that performs recording and reproducing of the magnetic recording medium 10 having the above-described configuration will be described with reference to FIG. 6.

The recording and reproducing apparatus 30 may be configured to be capable of adjusting the tension applied to the magnetic recording medium 10 in the longitudinal direction. Furthermore, the recording and reproducing apparatus 30 has a configuration in which a magnetic recording cartridge 10A can be loaded. Here, in order to make the description easy, a case is described in which the recording and reproducing apparatus 30 has a configuration in which one magnetic recording cartridge 10A can be loaded, but the recording and reproducing apparatus 30 may have a configuration in which a plurality of magnetic recording cartridges 10A can be loaded.

The recording and reproducing apparatus 30 is preferably a timing servo type magnetic recording and reproducing apparatus. The magnetic recording medium of the present technology is suitable for use in a timing servo type magnetic recording and reproducing apparatus.

The recording and reproducing apparatus 30 is connected to information processors such as a server 41, a personal computer (hereinafter referred to as a "PC") 42, and the like via a network 43, and is configured to be capable of recording data supplied from the information processors in the magnetic recording cartridge 10A. The shortest recording wavelength of the recording and reproducing apparatus 30 is preferably 100 nm or less, more preferably 75 nm or less, still more preferably 60 nm or less, and particularly preferably 50 nm or less.

Figure 6:
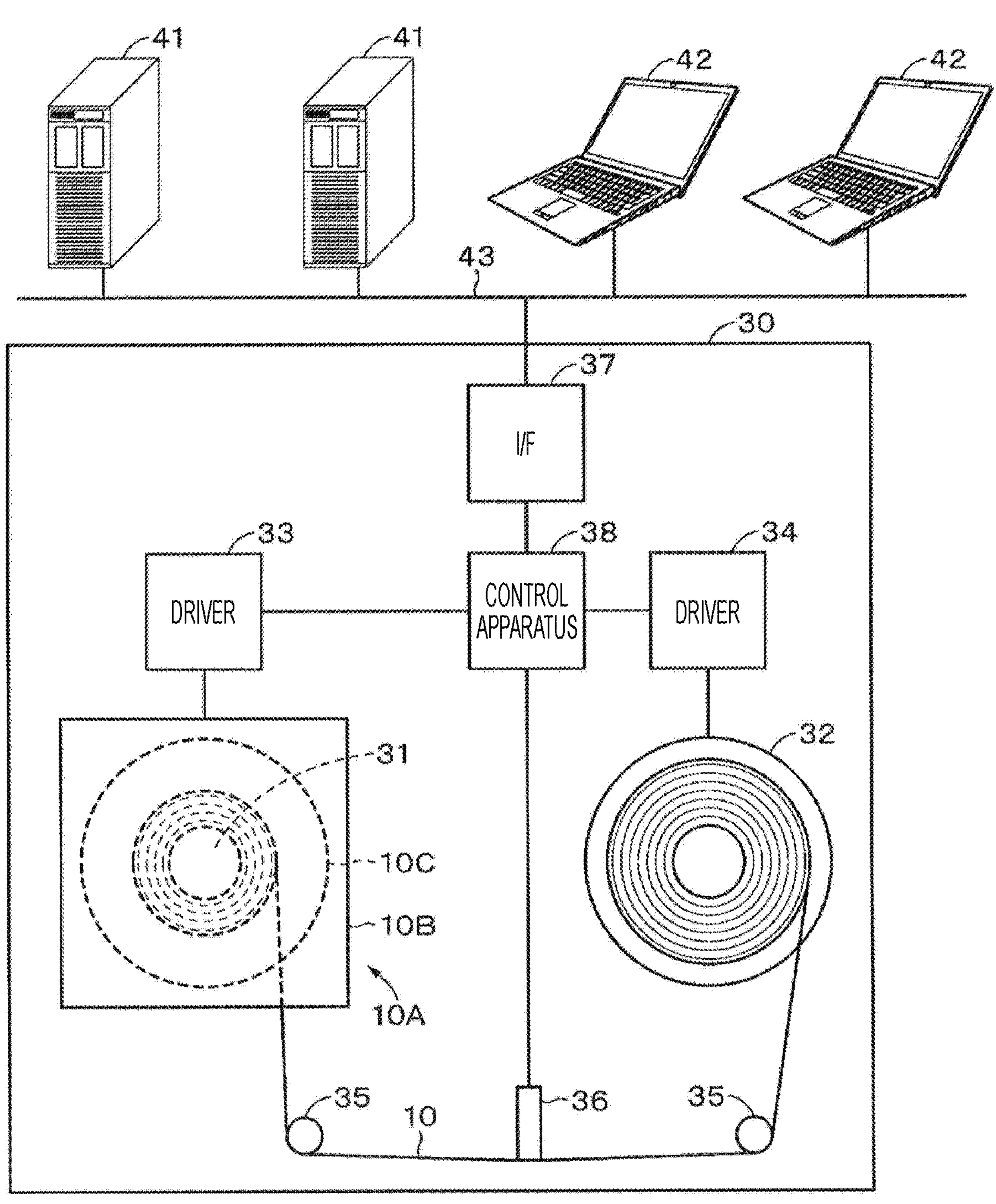
FIG. 6 is a schematic view illustrating a configuration of a recording and reproducing apparatus.

As illustrated in FIG. 6, the recording and reproducing apparatus includes a spindle 31, a reel 32 on the recording and reproducing apparatus side, a spindle driver 33, a reel driver 34, a plurality of guide rollers 35, a head unit 36, a communication interface (hereinafter, I/F) 37, and a control apparatus 38.

The spindle 31 is configured so that the magnetic recording cartridge 10A can be loaded thereon. The magnetic recording cartridge 10A conforms to the Linear Tape-Open (LTO) standard and includes a cartridge case 10B accommodating a rotatable single reel 10C in which the magnetic recording medium 10 is wound. In the magnetic recording medium 10, a servo pattern in an inverted V-shape is recorded in advance as a servo signal. The reel 32 is configured to be capable of fixing a leading end of the magnetic recording medium 10 drawn out from the magnetic recording cartridge 10A.

The present technology also provides a magnetic recording cartridge including the magnetic recording medium according to the present technology. In the magnetic recording cartridge, for example, the magnetic recording medium may be wound around a reel, and may be accommodated in a case in a state of being wound around the reel.

The spindle driver 33 is an apparatus that rotationally drives the spindle 31. The reel driver 34 is an apparatus that rotationally drives the reel 32. When data is recorded in or reproduced from the magnetic recording medium 10, the spindle driver 33 and the reel driver 34 rotationally drive the spindle 31 and the reel 32, respectively, to make the magnetic recording medium 10 travel. The guide rollers 35 are a roller for guiding travel of the magnetic recording medium 10.

The head unit 36 includes a plurality of recording heads for recording data signals in the magnetic recording medium 10, a plurality of reproducing heads for reproducing the data signals recorded in the magnetic recording medium 10, and a plurality of servo heads for reproducing the servo signals recorded in the magnetic recording medium 10. As the recording head, for example, a ring head can be used, but the type of the recording head is not limited thereto.

The communication I/F 37 is for communicating with the information processors such as the server 41, the PC 42, and the like, and is connected to the network 43.

The control apparatus 38 controls a whole of the recording and reproducing apparatus 30. For example, in response to a request from the information processors such as the server 41, the PC 42, and the like, the control apparatus 38 records the data signal supplied from the information processor in the magnetic recording medium 10 by the head unit 36. Furthermore, in response to a request from the information processors such as the server 41, the PC 42, and the like, the control apparatus 38 reproduces the data signal recorded in the magnetic recording medium 10 by the head unit 36 and supplies the data signal to the information processor.

[Operation of Recording and Reproducing Apparatus]

Next, an operation of the recording and reproducing apparatus 30 having the above-described configuration will be described.

First, the magnetic recording cartridge 10A is loaded in the recording and reproducing apparatus 30, a leading end of the magnetic recording medium 10 is drawn out and transferred to the reel 32 via the plurality of guide rollers 35 and the head unit 36, and the leading end of the magnetic recording medium 10 is attached to the reel 32.

Next, when an operation unit (not illustrated) is operated, the spindle driver 33 and the reel driver 34 are driven by control of the control apparatus 38, and the spindle 31 and the reel 32 are rotated in the same direction so that the magnetic recording medium 10 travels from the reel 10C toward the reel 32. As a result, while the magnetic recording medium 10 is wound around the reel 32, the head unit 36 records information in the magnetic recording medium 10 or reproduces the information recorded in the magnetic recording medium 10.

Furthermore, when the magnetic recording medium 10 is rewound around the reel 10C, the spindle 31 and the reel 32 are rotationally driven in the direction opposite to the above direction, and thus the magnetic recording medium 10 travels from the reel 32 to the reel 10C. Also at the time of rewinding, the head unit 36 records information in the magnetic recording medium 10 or reproduces the information recorded in the magnetic recording medium 10.

(6) Modified Examples

Modified Example 1

The magnetic recording medium 10 may be incorporated in a library apparatus. That is, the present technology also provides a library apparatus including at least one magnetic recording medium 10. The library apparatus has a configuration capable of adjusting the tension applied to the magnetic recording medium 10 in the longitudinal direction, and may include a plurality of the above-described recording and reproducing apparatus 30.

3. Second Embodiment

(1) Embodiment of Magnetic Recording Cartridge

[Configuration of Cartridge]

The present technology also provides a magnetic recording cartridge (also referred to as a tape cartridge) including the magnetic recording medium according to the present technology. In the magnetic recording cartridge, the magnetic recording medium may be wound around, for example, a reel. The magnetic recording cartridge may include, for example, a communication unit that communicates with a recording and reproducing apparatus, a storage unit, and a control unit that stores information received from the recording and reproducing apparatus via the communication unit in the storage unit, reads the information from the storage unit in response to a request from the recording and reproducing apparatus, and transmits the information to the recording and reproducing apparatus via the communication unit. The information may include adjustment information for adjusting the tension applied to the magnetic recording medium in the longitudinal direction.

An example of a configuration of a magnetic recording cartridge 10A including the magnetic recording medium T having the above-described configuration will be described with reference to FIG. 7.

Figure 7:
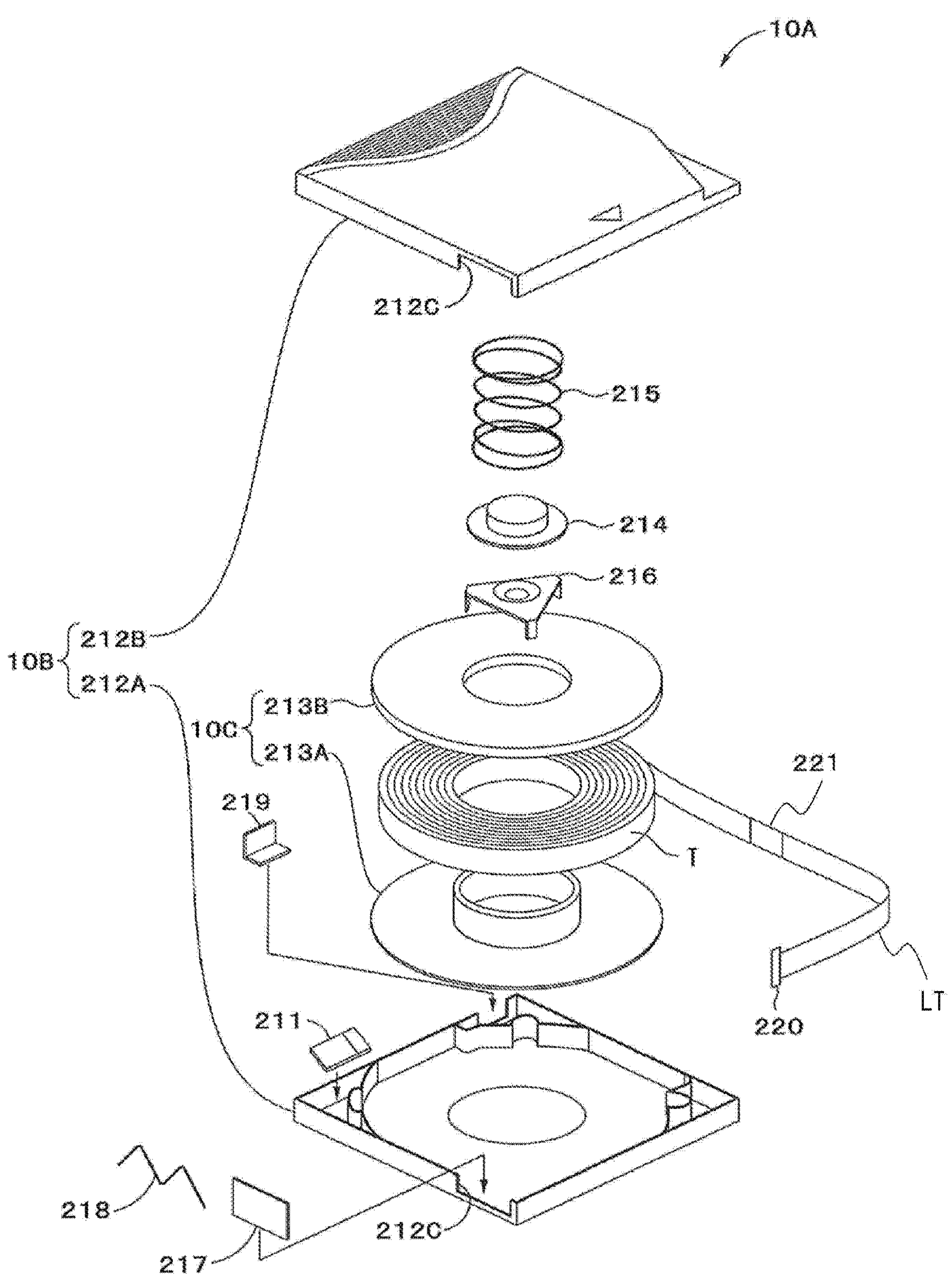
FIG. 7 is an exploded perspective view illustrating an example of a configuration of a magnetic recording cartridge.

FIG. 7 is an exploded perspective view illustrating an example of a configuration of a magnetic recording cartridge 10A. The magnetic recording cartridge 10A is a magnetic recording cartridge conforming to the Linear Tape-Open (LTO) standard, and includes, inside a cartridge case 10B including a lower shell 212A and an upper shell 212B, a reel 10C in which a magnetic tape (tape-shaped magnetic recording medium) T is wound, a reel lock 214 and a reel spring 215 for locking rotation of the reel 10C, a spider 216 for unlocking the locking state of the reel 10C, a slide door 217 for opening and closing a tape outlet 212C provided in the cartridge case 10B across the lower shell 212A and the upper shell 212B, a door spring 218 for energizing the slide door 217 to the closed position of the tape outlet 212C, a write protect 219 for preventing erroneous erasure, and a cartridge memory 211. The reel 10C has a substantially disk-like shape having an opening at the center portion, and includes a reel hub 213A and a flange 213B including a hard material such as plastic or the like. A leader tape LT is connected to one end portion of the magnetic tape T. A leader pin 220 is provided at a leading end of the leader tape LT.

The cartridge memory 211 is provided in the vicinity of one corner of the magnetic recording cartridge 10A. In a state where the magnetic recording cartridge 10A is loaded in a recording and reproducing apparatus 80, the cartridge memory 211 faces a reader/writer (not illustrated) of the recording and reproducing apparatus 80. The cartridge memory 211 communicates with a recording and reproducing apparatus 30, specifically, a reader/writer (not illustrated) in accordance with a wireless communication standard conforming to the LTO standard.

[Configuration of Cartridge Memory]

An example of a configuration of the cartridge memory 211 will be described with reference to FIG. 8.

FIG. 8 is a block diagram illustrating an example of a configuration of the cartridge memory 211. The cartridge memory 211 includes an antenna coil (communication unit) 331 that communicates with a reader/writer (not illustrated) in accordance with a prescribed communication standard, a rectification/power supply circuit 332 that generates and rectifies a power to generate a power supply using an induced electromotive force from a radio wave received by the antenna coil 331, a clock circuit 333 that generates a clock similarly using the induced electromotive force from the radio wave received by the antenna coil 331, a detection/modulation circuit 334 that detects the radio wave received by the antenna coil 331 and modulates a signal to be transmitted by the antenna coil 331, a controller (control unit) 335 including a logic circuit and the like for discriminating commands and data from digital signals extracted from the detection/modulation circuit 334 and processing the commands and the data, and a memory (storage unit) 336 that stores information. Furthermore, the cartridge memory 211 includes a capacitor 337 connected in parallel to the antenna coil 331 to configure a resonance circuit with the antenna coil 331 and the capacitor 337.

The memory 336 stores information relating to the magnetic recording cartridge 10A, and the like. The memory 336 is a non volatile memory (NVM). The memory 336 preferably has a storage capacity of about 32 KB or more.

The memory 336 includes a first storage area 336A and a second storage area 336B. The first storage area 336A is an area for storing information conforming to the LTO standard prior to LTO8. Examples of the information conforming to the LTO standard prior to LTO8 include manufacturing information (for example, a unique number of the magnetic recording cartridge 10A, or the like), a use history (for example, the number of times of tape withdrawal (thread count), or the like), and the like.

The second storage area 336B is an area for storing additional information. Here, the additional information means information, relating to the magnetic recording cartridge 10A, that is not prescribed in the LTO standard prior to LTO8. Examples of the additional information include, but are not limited to, data such as tension adjustment information, management ledger data, index information, thumbnail information of a moving image stored in the magnetic tape T, and the like.

The memory 336 may have a plurality of banks. In this case, some of the plurality of banks may constitute the first storage area 336A, and the remaining banks may constitute the second storage area 336B.

The antenna coil 331 induces an induced voltage by electromagnetic induction. The controller 335 communicates with the recording and reproducing apparatus 80 in accordance with a prescribed communication standard via the antenna coil 331. Specifically, for example, mutual authentication, command transmission/reception, data exchange, and the like are performed.

The controller 335 stores the information received from the recording and reproducing apparatus 80 via the antenna coil 331 in the memory 336. In response to a request from the recording and reproducing apparatus 80, the controller 335 reads information from the memory 336 and transmits the information to the recording and reproducing apparatus 80 via the antenna coil 331.

(2) Modified Example of Magnetic Recording Cartridge

[Configuration of Cartridge]

In one embodiment of the magnetic recording cartridge described above, a case where the magnetic tape cartridge is a one-reel cartridge is described, but the magnetic recording cartridge of the present technology may be a two-reel cartridge. That is, the magnetic recording cartridge of the present technology may have one or a plurality of (for example, two) reels around which the magnetic tape is wound. Hereinafter, an example of the magnetic recording cartridge of the present technology having two reels will be described with reference to FIG. 9.

Figure 9:
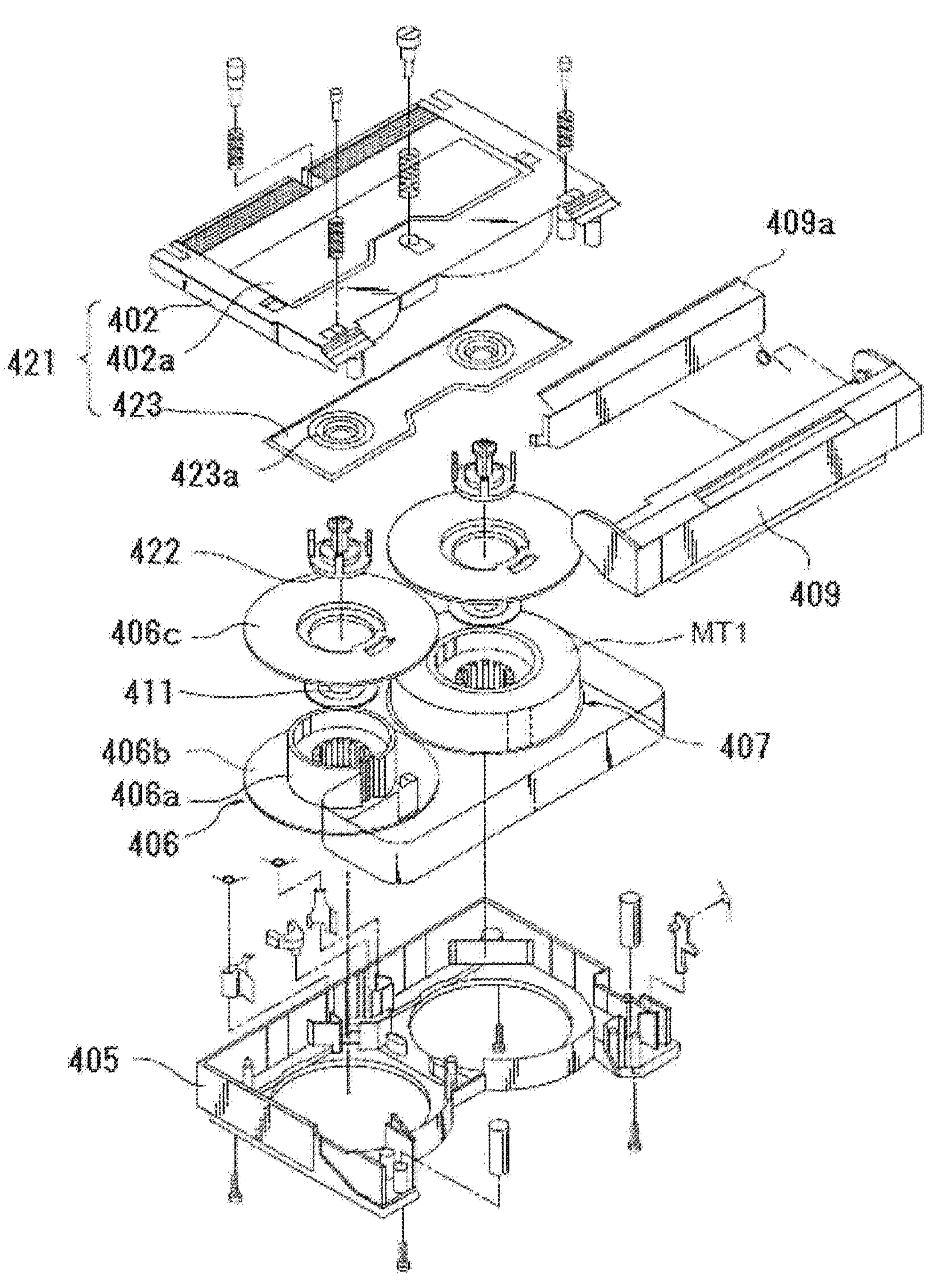
FIG. 9 is an exploded perspective view illustrating an example of a configuration of a magnetic recording cartridge of a modified example.

FIG. 9 is an exploded perspective view illustrating an example of a configuration of a two-reel cartridge 421. The cartridge 421 includes an upper half 402 including a synthetic resin, a transparent window member 423 fitted and fixed to a window portion 402*a* opened in an upper surface of the upper half 402, reel holders 422 fixed to an inner side of the upper half 402 and preventing uplift of reels 406 and 407, a lower half 405 corresponding to the upper half 402, the reels 406 and 407 stored in a space formed by combining the upper half 402 and the lower half 405, a magnetic tape MT1 wound around the reels 406 and 407, a front lid 409 closing a front side opening formed by combining the upper half 402 and the lower half 405, and a back lid 409A protecting the magnetic tape MT1 exposed at the front side opening.

The reel 406 includes a lower flange 406*b* having a cylindrical hub portion 406*a*, in a central portion, around which the magnetic tape MT1 is wound, an upper flange 406*c* having substantially the same size as the lower flange 406*b*, and a reel plate 411 interposed between the hub portion 406*a* and the upper flange 406*c*. The reel 407 has a configuration similar to that of the reel 406.

The window member 423 is provided with attachment holes 423*a* at positions corresponding to the reels 406 and 407, respectively, for assembling the reel holders 422 as reel holding units that prevent the reels from being lifted up. The magnetic tape MT1 is similar to the magnetic tape T in the first embodiment.

The present technology can also adopt the following configurations.

[1]

A magnetic recording medium including:

a magnetic layer; an underlayer; and a base layer in this order, in which the underlayer contains a chlorine-containing binder, and in the underlayer, a part having a chlorine count equal to or more than a threshold described below has a thickness of 130 nm or less, and a core portion level difference Rk is 5.5 nm or less and an average thickness of the underlayer is 1100 nm or less in a bearing curve created on the basis of height data of a magnetic layer side surface acquired using an atomic force microscope.

[Threshold]=[an average chlorine count in the underlayer]+6×[a standard deviation determined in calculation of the average chlorine count]

[2]

The magnetic recording medium according to [1], in which the part equal to or more than the threshold is present in a side close to the base layer in the underlayer.

[3]

The magnetic recording medium according to [1] or [2], in which a total thickness of the magnetic layer and the underlayer is 1000 nm or less.

[4]

The magnetic recording medium according to any one of [1] to [3], in which the magnetic layer has a thickness of 80 nm or less.

[5]

The magnetic recording medium according to any one of [1] to [4], in which the underlayer contains a non-magnetic powder.

[6]

The magnetic recording medium according to any one of [1] to [5], in which the underlayer contains a lubricant.

[7]

The magnetic recording medium according to any one of [1] to [6], having an average thickness $t_T$ of 5.5 μm or less.

[8]

The magnetic recording medium according to any one of [1] to [7], in which the magnetic layer contains a magnetic powder.

[9]

The magnetic recording medium according to [8], in which the magnetic powder contains hexagonal ferrite, ε-iron oxide, or Co-containing spinel ferrite.

[10]

The magnetic recording medium according to any one of [1] to [9], in which the core portion level difference Rk is 5.0 nm or less.

[11]

The magnetic recording medium according to any one of [1] to [10], in which a height of the bearing curve at an area ratio of 10.00% is 2.80 nm or less.

[12]

A magnetic recording medium including:

a magnetic layer; an underlayer; and a base layer in this order, in which the underlayer contains a chlorine-containing binder, and in the underlayer, a part having a chlorine count equal to or more than a threshold described below has a thickness of 12% or less of a thickness of the underlayer, and a core portion level difference Rk is 5.5 nm or less and an average thickness of the underlayer is 1100 nm or less in a bearing curve created on the basis of height data of a magnetic layer side surface acquired using an atomic force microscope.

[Threshold]=[an average chlorine count in the underlayer]+6×[a standard deviation determined in calculation of the average chlorine count]

[13]

A magnetic recording cartridge including the magnetic recording medium according to any one of [1] to [12], the magnetic recording medium accommodated in a case in a state of being wound around a reel.

[14]

A magnetic recording cartridge including:

the tape-shaped magnetic recording medium according to any one of [1] to [12];

a communication unit that communicates with a recording and reproducing apparatus;

a storage unit; and a control unit that stores information received from the recording and reproducing apparatus via the communication unit in the storage unit, and reads the information from the storage unit in response to a request from the recording and reproducing apparatus, and transmits the information to the recording and reproducing apparatus via the communication unit, in which the information includes adjustment information for adjusting a tension applied to the magnetic recording medium in a longitudinal direction.

[15]

The magnetic recording medium according to any one of [1] to [12], in which the base layer contains a polyester-based material or a polyether ether ketone-based material.

4. Examples

Hereinafter, the present technology will be described more specifically with reference to Examples, but the present technology is not limited only to these Examples. Note that values of various parameters appearing in these Examples are obtained by the above-described measurement methods unless otherwise specified.

Magnetic tapes were obtained as described in Comparative Examples 1 to 5 and Examples 1 to 3 described below.

Comparative Example 1

(Step of Preparing Coating Material for Forming Magnetic Layer)

A coating material for forming a magnetic layer was prepared as follows. First, a first composition having the following formulation was kneaded with an extruder. Next, the kneaded first composition and a second composition having the following formulation were added to a stirring tank equipped with a disperser and premixing was performed. Subsequently, dyno mill mixing was further performed, and filter treatment was performed to prepare a coating material for forming a magnetic layer.

(First Composition)

Barium ferrite ($BaFe_{12}O_{19}$) magnetic powder (hexagonal plate-like shape, average aspect ratio: 2.6, average particle volume: 1,300 $nm^3$): 100 parts by mass Vinyl chloride-based resin (cyclohexanone solution: 30 mass %): 50 parts by mass (degree of polymerization: 300, Mn=10000, containing $OSO_3K$=0.07 mmol/g and secondary OH=0.3 mmol/g as polar groups).

Aluminum oxide powder: 5 parts by mass ($\alpha$-$Al_2O_3$, average particle diameter: 0.1 μm)

(Second Composition)

Carbon black: 2 parts by mass (manufactured by TOKAI CARBON CO., LTD., trade name: SEAST TA)

Polyurethane resin (resin solution: blending amount of polyurethane resin: 30 mass %, blending amount of cyclohexanone: 70 mass %): 5.56 parts by mass (polyurethane resin: number average molecular weight Mn=25000, Tg: 110° C.)

n-Butyl stearate: 2 parts by mass

Methyl ethyl ketone: 121.3 parts by mass

Toluene: 121.3 parts by mass

Cyclohexanone: 60.7 parts by mass

Finally, 3.3 parts by mass of polyisocyanate (trade name: Coronate L, manufactured by Tosoh Corporation) as a curing agent and 2 parts by mass of stearic acid were added to the coating material for forming a magnetic layer prepared as described above.

(Step of Preparing Coating Material for Forming Underlayer)

A third composition having the following formulation was kneaded with an extruder. Next, the kneaded third composition and a fourth composition having the following formulation were added to a stirring tank equipped with a disperser, and premixing was performed. Subsequently, mixing was further performed using a bead mill ECM-PRO (manufactured by SHINMARU ENTERPRISES CORPORATION) at a circulation flow rate of 500 L/h to 2000 L/h for a treatment time in the bead mill of 100 minutes, and then filter treatment was performed to prepare a coating material for forming an underlayer.

(Third Composition)

Acicular iron oxide powder: 100 parts by mass ($\alpha$-$Fe_2O_3$, average long axis length: 0.15 μm)

Aluminum oxide powder: 5 parts by mass ($\alpha$-$Al_2O_3$, average particle diameter: 80 nm, manufactured by SUMITOMO CHEMICAL COMPANY, LIMITED, trade name: HIT82, Mohs hardness: 9)

Vinyl chloride-based resin: 55.6 parts by mass (resin solution: resin content: 30 mass %, cyclohexanone: 70 mass %)

(Fourth Composition)

Carbon black: 30 parts by mass (average particle diameter: 20 nm)

Polyurethane-based resin UR8200 (manufactured by TOYOBO CO., LTD.): 18.5 parts by mass n-Butyl stearate: 2 parts by mass Methyl ethyl ketone: 223.0 parts by mass Toluene: 223.0 parts by mass Cyclohexanone: 49.6 parts by mass Finally, 2 parts by mass of polyisocyanate (trade name: Coronate L, manufactured by Tosoh Corporation) as a curing agent and 2 parts by mass of stearic acid were added to the coating material for forming an underlayer prepared as described above.

(Step of Preparing Coating Material for Forming Back Layer)

A coating material for forming a back layer was prepared as follows. The following raw materials were mixed in a stirring tank equipped with a disperser and subjected to filter treatment to prepare the back layer forming coating material.

Carbon black (manufactured by Asahi Carbon Co., Ltd., trade name: #80): 100 parts by mass Polyester polyurethane: 100 parts by mass (resin solution: blending amount of polyurethane resin: 30 mass %, blending amount of cyclohexanone: 70 mass %)

(manufactured by Nippon Polyurethane Industry Co., Ltd., trade name: N-2304)

Methyl ethyl ketone: 500 parts by mass

Toluene: 400 parts by mass

Cyclohexanone: 100 parts by mass

Polyisocyanate (trade name: Coronate L, manufactured by Tosoh Corporation): 10 parts by mass (Film Forming Step)

A magnetic tape was prepared as described below using the coating materials prepared as described above.

First, as a support body to be a base layer of a magnetic tape, a PEN film (base film) having an elongated shape and an average thickness of 4.00 μm was prepared. Next, the coating material for forming an underlayer was applied onto one principal surface of the PEN film and dried to form an underlayer on the one principal surface of the PEN film so that the underlayer in a final product had an average thickness of 1120 nm. Next, the coating material for forming a magnetic layer was applied onto the underlayer and dried to form a magnetic layer on the underlayer so that the magnetic layer in a final product had an average thickness of 80 nm. Furthermore, the magnetic layer was subjected to vertical orientation processing using a solenoid coil or a permanent magnet.

Subsequently, the coating material for forming a back layer was applied onto the other principal surface of the PEN film on which the underlayer and the magnetic layer were formed, the coating material was dried, and thus a back layer was formed so that the back layer in a final product had an average thickness of 0.30 μm. Then, the PEN film on which the underlayer, the magnetic layer, and the back layer were formed was subjected to curing treatment. Thereafter, calender processing was performed to smooth the surface of the magnetic layer.

(Cutting Step)

The magnetic tape obtained as described above was cut into a width of ½ inches (12.65 mm). Thus, a magnetic tape having an elongated shape was obtained.

The magnetic tape having a width of ½ inches was wound around a reel provided in a cartridge case to obtain a multi-winding magnetic recording cartridge.

A servo signal was recorded in the magnetic tape with a servo track writer. The servo signal included rows of magnetic patterns in an inverted V-shape, and the magnetic patterns were recorded in advance in two or more rows in parallel in the longitudinal direction at a known interval (hereinafter, referred to as a "known interval between magnetic pattern rows recorded in advance").

For the magnetic recording cartridge, as described in "(3) Physical Properties and Structure" in 2. above, various values relating to the chlorine distribution, such as the chlorine count and the thickness of the part having a chlorine count equal to or more than the threshold in the underlayer, were measured. These measurement results are shown in Table 1 below. As shown in the same table, the average chlorine count $C_{ave}$ in the underlayer was 1.161. Furthermore, the standard deviation σ was 0.063. Therefore, the threshold ($C_{ave}+6\sigma$) was 1.539.

The thickness of the part equal to or more than the threshold in the underlayer was 143 nm. The part equal to or more than the threshold was present so as to be in contact with the interface between the underlayer and the base layer, that is, present in a range within 200 nm from the interface.

Furthermore, the ratio of "the thickness of the part equal to or more than the threshold" to "the thickness of the underlayer" was 13%.

Furthermore, the peak chlorine count in the magnetic layer (maximum chlorine count in the magnetic layer) $C_{mp}$ was 5.393, and "the peak chlorine count in the magnetic layer, $C_{mp}$"/"the average chlorine count in the underlayer, $C_{ave}$" was 4.64.

For the magnetic recording cartridge, as described in "(3) Physical Properties and Structure" in 2. above, the core portion level difference Rk and the height at the area ratio of 10.00% of the bearing curve were measured. The measurement results are shown in Table 1 below. As shown in the same table, the core portion level difference Rk was 5.6, and the height at the area ratio of 10.00% of the bearing curve was 2.8 nm.

Comparative Example 2

A magnetic tape was obtained by the same method as in Comparative Example 1 except that the same coating material for forming an underlayer as in Comparative Example 1 was used, and the treatment time in the bead mill in the step of preparing the coating material for forming an underlayer was extended to 1.2 times as compared with the case of Comparative Example 1, the thicknesses of the magnetic layer and the underlayer to be formed were made thinner, and the curing treatment was additionally performed after the calendering treatment. Furthermore, a magnetic recording cartridge accommodating the magnetic tape was obtained in a manner similar to that in Comparative Example 1.

For the magnetic recording cartridge, as in Comparative Example 1, various values regarding the chlorine distribution, the core portion level difference Rk, and the height at 10.00% area ratio of the bearing curve were measured. The measurement results are shown in Table 1 as in Comparative Example 1.

Comparative Example 3

A magnetic tape was obtained by the same method as in Comparative Example 1 except that the same coating material for forming an underlayer as in Comparative Example 1 was used, the drying temperature applied when drying the coating material for forming an underlayer applied on one principal surface of the PEN film was lower than that in Comparative Example 1, the movement of the chlorine-containing binder (binder) of the underlayer was restricted by reducing the movement amount of the solvent, and Rk was adjusted using an aluminum oxide powder having an average particle diameter of 50 nm as the aluminum oxide powder contained in the magnetic layer. Furthermore, a magnetic recording cartridge accommodating the magnetic tape was obtained in a manner similar to that in Comparative Example 1. For the magnetic recording cartridge, as in Comparative Example 1, various values regarding the chlorine distribution, the core portion level difference Rk, and the height at 10.00% area ratio of the bearing curve were measured. The measurement results are shown in Table 1 in the same manner as in Comparative Example 1.

Furthermore, from comparison with Comparative Example 1, the thickness of the part equal to or more than the threshold is further increased by further lowering the drying temperature. Therefore, it can be seen that the thickness can be adjusted by adjusting the drying temperature.

Example 1

A magnetic tape was obtained by the same method as in Comparative Example 1 except that the polyurethane-based resin of the coating material for forming an underlayer of Comparative Example 1 was changed to one having a lower glass transition temperature Tg, and the calendering effect was increased to adjust Rk, the treatment time in the bead mill in the step of preparing the coating material for forming an underlayer was extended to 1.2 times as compared with the case of Comparative Example 1, the thickness of the underlayer was reduced as compared with the case of Comparative Example 1, the dispersion was improved to increase the adsorption amount of the chlorine-containing binder (binder), and the amount of the chlorine-containing binder moving to the interface side between the underlayer and the base layer due to the solvent permeating during the application of the magnetic layer was reduced. Furthermore, a magnetic recording cartridge accommodating the magnetic tape was obtained in a manner similar to that in Comparative Example 1.

For the magnetic recording cartridge, as in Comparative Example 1, various values regarding the chlorine distribution, the core portion level difference Rk, and the height at 10.00% area ratio of the bearing curve were measured. The measurement results are shown in Table 1 as in Comparative Example 1.

The average chlorine count $C_{ave}$ in the underlayer was 1.100 and the standard deviation σ was 0.040, and therefore the threshold ($C_{ave}+6\sigma$) was 1.340.

The thickness of the part equal to or more than the threshold in the underlayer was 85 nm. The part equal to or more than the threshold was present so as to be in contact with the interface between the underlayer and the base layer, that is, present in a range within 150 nm, and particularly 100 nm from the interface.

Furthermore, the ratio of "the thickness of the part equal to or more than the threshold" to "the thickness of the underlayer" was 9%.

Furthermore, the peak chlorine count in the magnetic layer (maximum chlorine count in the magnetic layer) $C_{mp}$ was 6.506, and "the peak chlorine count in the magnetic layer, $C_{mp}$"/"the average chlorine count in the underlayer, $C_{ave}$" was 5.91.

The core portion level difference Rk was 3.9, and the height at the area ratio of 10.00% of the bearing curve was 2.0 nm.

As described above, by extending the treatment time in the bead mill, the dispersion state of the component in the coating material is further enhanced, and more chlorine-containing binder is bound to the inorganic material. Furthermore, when the coating material for forming a magnetic layer is applied, the solvent contained in the coating material for forming a magnetic layer permeates the underlayer to cause a movement of the chlorine-containing binder not bound to the inorganic material in the underlayer to the base layer side. As described above, more chlorine-containing binder is bound to the inorganic material, and therefore the amount of the chlorine-containing binder that moves is decreased. Therefore, this is considered to be a reason that the thickness (and the ratio) of the part equal to or more than the threshold in Example 1 was smaller than the thickness (and the ratio) of the part equal to or more than the threshold in Comparative Example 1.

Example 2

A magnetic tape was obtained in the same manner as in Comparative Example 1 except that the aluminum oxide powder contained in the magnetic layer of Comparative Example 1 was changed to one having an average particle diameter of 50 nm, the Rk of the surface of the magnetic layer was adjusted by thinning the magnetic layer and the underlayer to be formed, the volatilization rate of the solvent from the surface of the magnetic layer was increased by setting the drying temperature after the application of the coating material for forming a magnetic layer to be higher than that in Example 1, the solvent once moved to the base layer side was moved to the surface of the magnetic layer side together with the volatile solvent, and the amount of the chlorine-containing binder (binder) remaining in the base layer was reduced. Furthermore, a magnetic recording cartridge accommodating the magnetic tape was obtained in a manner similar to that in Comparative Example 1.

For the magnetic recording cartridge, as in Comparative Example 1, various values regarding the chlorine distribution, the core portion level difference Rk, and the height at 10.00% area ratio of the bearing curve were measured. The measurement results are shown in Table 1 as in Comparative Example 1.

The average chlorine count $C_{ave}$ in the underlayer was 1.071 and the standard deviation σ was 0.039, and therefore the threshold ($C_{ave}$+6σ) was 1.305.

The thickness of the part equal to or more than the threshold in the underlayer was 77 nm. The part equal to or more than the threshold was present so as to be in contact with the interface between the underlayer and the base layer, that is, present in a range within 150 nm, and particularly 100 nm from the interface.

Furthermore, the ratio of "the thickness of the part equal to or more than the threshold" to "the thickness of the underlayer" was 10%.

Furthermore, the peak chlorine count in the magnetic layer (maximum chlorine count in the magnetic layer) $C_{mp}$ was 7.956, and "the peak chlorine count in the magnetic layer, $C_{mp}$"/"the average chlorine count in the underlayer, $C_{ave}$" was 7.43.

The core portion level difference Rk was 4.3, and the height at the area ratio of 10.00% of the bearing curve was 1.3 nm.

When the coating material for forming a magnetic layer is applied to the underlayer, the solvent in the coating material for forming a magnetic layer permeates the underlayer, and the permeating solvent also moves to the base layer side. By further thinning the underlayer and further increasing the drying temperature as described above, the volatilization rate of the solvent in the coating material for forming a magnetic layer is increased. By increasing the volatilization rate, the permeating solvent is moved toward the magnetic surface, and thus the amount of the chlorine-containing binder remaining in the base layer side is decreased. Therefore, this considered to be a reason that the thickness (and the ratio) of the part equal to or more than the threshold in Example 2 was still smaller than the thickness (and the ratio) of the part equal to or more than the threshold in Example 1.

Example 3

A magnetic tape was obtained in the same manner as in Comparative Example 1 except that the aluminum oxide powder contained in the magnetic layer of Comparative Example 1 was changed to one having an average particle diameter of 50 nm, Rk was adjusted by changing the polyurethane-based resin of the underlayer forming coating material to one having a low glass transition temperature Tg, the treatment time in the bead mill in the step of preparing the coating material for forming an underlayer was extended to 1.1 times as compared with the case of Comparative Example 1, the dispersion was improved to increase the adsorption amount of the chlorine-containing binder, and the amount of the chlorine-containing binder moving to the interface side between the underlayer and the base layer due to the solvent permeating during the application of the coating material for forming a magnetic layer was reduced. Furthermore, a magnetic recording cartridge accommodating the magnetic tape was obtained in a manner similar to that in Comparative Example 1.

For the magnetic recording cartridge, as in Comparative Example 1, various values regarding the chlorine distribution, the core portion level difference Rk, and the height at 10.00% area ratio of the bearing curve were measured. The measurement results are shown in Table 1 as in Comparative Example 1.

The average chlorine count $C_{ave}$ in the underlayer was 1.110 and the standard deviation σ was 0.052, and therefore the threshold ($C_{ave}$+6σ) was 1.422.

The thickness of the part equal to or more than the threshold in the underlayer was 121 nm. The part equal to or more than the threshold was present so as to be in contact with the interface between the underlayer and the base layer, that is, present in a range within 150 nm, and particularly 130 nm from the interface.

Furthermore, the ratio of "the thickness of the part equal to or more than the threshold" to "the thickness of the underlayer" was 11%.

Furthermore, the peak chlorine count in the magnetic layer (maximum chlorine count in the magnetic layer) $C_{mp}$ was 6.675, and "the peak chlorine count in the magnetic layer, $C_{mp}$"/"the average chlorine count in the underlayer, $C_{ave}$" was 6.01.

The core portion level difference Rk was 3.9, and the height at the area ratio of 10.00% of the bearing curve was 1.9 nm.

As described regarding Example 1, by extending the treatment time in the bead mill, the dispersion state of the component in the coating material for forming an underlayer is further enhanced, and more chlorine-containing binder is bound to the inorganic material. Since more chlorine-containing binder is bound to the inorganic material, as described above, the amount of the chlorine-containing binder that moves to the base layer side is decreased at the time of applying the coating material for forming a magnetic layer. Therefore, this is considered to be a reason that the thickness (and the ratio) of the part equal to or more than the threshold in Example 1 was smaller than the thickness (and the ratio) of the part equal to or more than the threshold in Comparative Example 3.

Furthermore, from comparison with Example 1, the thickness of the part equal to or more than the threshold is further decreased by further enhancing the dispersion state of the component in the coating material for forming an underlayer. Therefore, it can also be seen that the thickness can be adjusted by adjusting the dispersion state of the component in the coating material for forming an underlayer.

Comparative Example 4

A magnetic tape was obtained by the same method as in Example 2 except that the thickness of the underlayer to be formed was changed to 880 nm and a curing treatment was additionally performed after the calendering treatment. Furthermore, a magnetic recording cartridge accommodating the magnetic tape was obtained in a manner similar to that in Comparative Example 1.

For the magnetic recording cartridge, as in Comparative Example 1, various values regarding the chlorine distribution, the core portion level difference Rk, and the height at 10.00% area ratio of the bearing curve were measured. The measurement results are shown in Table 1 in the same manner as in Comparative Example 1.

Comparative Example 5

A magnetic tape was obtained in the same manner as in Comparative Example 1 except that the thickness of the underlayer to be formed was changed to 1100 nm, and a polyurethane-based resin having a low glass transition temperature Tg was used as the polyurethane-based resin of the coating material for forming an underlayer. Furthermore, a magnetic recording cartridge accommodating the magnetic tape was obtained in a manner similar to that in Comparative Example 1.

For the magnetic recording cartridge, as in Comparative Example 1, various values regarding the chlorine distribution, the core portion level difference Rk, and the height at 10.00% area ratio of the bearing curve were measured. The measurement results are shown in Table 1 in the same manner as in Comparative Example 1.

[Evaluation of Reliability]

Using the magnetic recording cartridges manufactured in Comparative Examples 1 to 5 and Examples 1 to 3, the reliability of the magnetic tape accommodated in each cartridge was evaluated. The evaluation was performed as follows.

The magnetic recording cartridge of Comparative Examples 1 to 5 and Examples 1 to 3 was inserted into an LTO8 drive immediately after travel of a cleaning tape, and after the insertion, subjected to recording processing back and forth one time. The multi-winding magnetic recording cartridge of Comparative Examples 1 to 5 and Examples 1 to 3 was subjected to this operation. The 25-winding (back and forth 25 times) magnetic recording cartridge was sequentially subjected to the recording processing, and in a case where there was no problem in travel in the recording processing in any winding, the reliability was determined to be "good".

In a case where a rewrite occurred twice at any point before completion of the recording processing of the 25-winding magnetic recording cartridge, the reliability was determined to be "poor". Furthermore, the number of windings when a rewrite occurred twice was also recorded. The evaluation result of each magnetic tape is shown in Table 1 below.

[Resolution]

A data signal was written into a data band between servo bands using an LTO9 Full Hight drive. At this time, the apparatus was controlled so that the tape speed was 1.85 m/s and the recording frequency was 10 MHz or 2.5 MHz, and the resolution value was obtained from the signal amount ratio of each frequency (signal amount $S_{2.5\ MHz}$/signal amount $S_{10\ MHz}$). Note that the signal amount ratio (signal amount $S_{2.5\ MHz}$/signal amount $S_{10\ MHz}$) of Example 1 was set to 100%, and the resolution value of each of Examples and Comparative Examples was obtained.

TABLE 1

| | Thickness of magnetic layer (nm) | Thickness of underlayer (nm) | Total thickness of magnetic layer and underlayer (nm) | Thickness of base layer (μm) | Thickness of back layer (μm) | Total thickness $t_T$ of tape (μm) | Average chlorine count in underlayer $C_{ave}$ | Standard deviation determined in calculation of average chlorine count σ | Threshold ($C_{ave}$ + 6σ) |
|---|---|---|---|---|---|---|---|---|---|
| Example 1 | 80 | 900 | 980 | 4.00 | 0.30 | 5.28 | 1.100 | 0.040 | 1.340 |
| Example 2 | 70 | 780 | 850 | 4.00 | 0.30 | 5.15 | 1.071 | 0.039 | 1.305 |
| Example 3 | 80 | 1100 | 1180 | 4.00 | 0.30 | 5.48 | 1.110 | 0.052 | 1.422 |
| Comparative Example 1 | 80 | 1120 | 1200 | 4.00 | 0.30 | 5.50 | 1.161 | 0.063 | 1.539 |
| Comparative Example 2 | 60 | 640 | 700 | 4.50 | 0.30 | 5.50 | 1.011 | 0.067 | 1.413 |
| Comparative Example 3 | 80 | 1100 | 1180 | 4.00 | 0.30 | 5.48 | 1.112 | 0.062 | 1.484 |
| Comparative Example 4 | 70 | 880 | 950 | 4.00 | 0.30 | 5.25 | 1.071 | 0.039 | 1.305 |
| Comparative Example 5 | 80 | 1100 | 1180 | 4.00 | 0.30 | 5.48 | 1.161 | 0.063 | 1.539 |

TABLE 1-continued

| | Thickness of part equal to or more than threshold (nm) | Ratio of thickness of part equal to or more than threshold (%) | $c_{mp}/c_{ave}$ | Peak chlorine count in magnetic layer $C_{mp}$ | Core portion level difference Rk (nm) | Height of bearing curve at area ratio (nm) 10.00% | Evaluation result of reliability | Resolution (%) |
|---|---|---|---|---|---|---|---|---|
| Example 1 | 85 | 9 | 5.91 | 6.506 | 3.9 | 2.0 | No occurrences in 25-winding | 100 |
| Example 2 | 77 | 10 | 7.43 | 7.956 | 4.3 | 1.3 | No occurrences in 25-winding | 104.2 |
| Example 3 | 121 | 11 | 6.01 | 6.675 | 3.9 | 1.9 | No occurrences in 25-winding | 101.7 |
| Comparative Example 1 | 143 | 13 | 4.64 | 5.393 | 5.6 | 2.8 | Second Rewrite occurred in 17th winding | 84 |
| Comparative Example 2 | 154 | 24 | 6.27 | 6.342 | 5.9 | 3.0 | Second Rewrite occurred in 10th winding | 82.3 |
| Comparative Example 3 | 148 | 13 | 5.44 | 6.045 | 5.7 | 2.9 | Second Rewrite occurred in 13th winding | 89.4 |
| Comparative Example 4 | 77 | 9 | 7.43 | 7.956 | 5.7 | 3.1 | No occurrences in 25-winding | 78.8 |
| Comparative Example 5 | 143 | 13 | 4.64 | 5.393 | 4.1 | 1.3 | Second Rewrite occurred in 17th winding | 101.8 |

As shown in Table 1, regarding all of the magnetic tapes of Examples 1 to 3, when the magnetic tape traveled back and forth one time in the 25-winding magnetic recording cartridge, the second rewrite did not occur in the magnetic recording cartridge in any winding. Meanwhile, regarding the magnetic tapes of Comparative Examples 1 to 3 and 5, the second rewrite occurred in the magnetic recording cartridge in the 17th, 10th, 13th, and 17th windings, respectively. From these results, it can be seen that the reliability during traveling is improved in the magnetic recording medium according to the present technology and the magnetic recording cartridge accommodating the magnetic recording medium.

From the results shown in Table 1, it can be seen that the reliability during traveling is enhanced if the part having a chlorine count equal to or more than the threshold in the underlayer has a further small thickness. From the results shown in the same table, the reliability of the magnetic tape during traveling is considered to be enhanced if the part equal to or more than the threshold has a thickness of, for example, 130 nm or less, 125 nm or less, or 123 nm or less, and more preferably 120 nm or less, 110 nm or less, 100 nm or less, or 90 nm or less.

Furthermore, from the results shown in Table 1, it can also be seen that the reliability during traveling is enhanced if the part having a chlorine count equal to or more than the threshold in the underlayer has a further small ratio in the thickness. From the results shown in the same table, the reliability of the magnetic tape during traveling is considered to be enhanced if the part equal to or more than the threshold has a ratio in the thickness of, for example, 12% or less, 11.5% or less, or 11% or less, and more preferably 10% or less, 9.5% or less, or 9% or less.

Furthermore, from the results shown in Table 1, the peak chlorine count in the magnetic layer, $C_{mp}$, is preferably, for example, 6.4 or more, or 6.5 or more. Furthermore, "the peak chlorine count in magnetic layer, $C_{mp}$"/"the average chlorine count in the underlayer, $C_{ave}$" is preferably, for example, 5.5 or more, or 5.7 or more.

Furthermore, as shown in Table 1, when comparing the results of Examples 1 to 3 with the results of Comparative Examples 1 to 4, it can be seen that when the core portion level difference Rk is 5.5 nm or less, the resolution can be 90% or more.

Furthermore, as shown in Table 1, when comparing the results of Examples 1 to 3 with the results of Comparative Examples 1 to 4, it can be seen that the resolution tends to be higher as the height at the area ratio of 10.00% of the bearing curve is lower.

Furthermore, as shown in Table 1, from the comparison between Example 1 and Example 3, it is found that the resolution is improved by thinning the underlayer.

Although embodiments and Examples of the present technology are specifically described above, the present technology is not limited to the embodiments and Examples described above, and various modifications based on the technical idea of the present technology may be made.

For example, the configurations, the methods, the steps, the shapes, the materials, the numerical values, and the like described in the embodiments and examples described above are merely examples, and different configurations, methods, steps, shapes, materials, numerical values, and the like may be used as needed. Furthermore, the chemical formulae of compounds and the like are representative and are not limited to the listed valences and the like as long as the compounds have a common name of the same compound.

Furthermore, the configurations, the methods, the steps, the shapes, the materials, the numerical values, and the like of the embodiments and Examples described above can be combined with each other without departing from the gist of the present technology.

Furthermore, in the present specification, a numerical range indicated by using "to" indicates a range including numerical values described before and after "to" as the minimum value and the maximum value, respectively. In the numerical ranges described in stages in the present description, the upper limit or the lower limit of a numerical range of a certain stage may be replaced with the upper limit or the lower limit of a numerical range of another stage. The materials exemplified in the present description may be used alone or in combination of two or more thereof unless otherwise specified.

REFERENCE SIGNS LIST

10 Magnetic recording medium
11 Base layer
12 Underlayer
13 Magnetic layer
14 Back layer

The invention claimed is:

1. A magnetic recording medium comprising:
a magnetic layer; an underlayer; and a base layer in this order, wherein
the underlayer contains a chlorine-containing binder,
in the underlayer, a part having a chlorine count equal to or more than a threshold described below has a thickness of 130 nm or less,
a core portion level difference Rk is 5.5 nm or less and an average thickness of the underlayer is 1100 nm or less in a bearing curve created on a basis of height data of a magnetic layer side surface acquired using an atomic force microscope, and

[the threshold]=[an average chlorine count in the underlayer]+6×[a standard deviation determined in calculation of the average chlorine count].

2. The magnetic recording medium according to claim 1, wherein the part having the chlorine count equal to or more than the threshold is present in a side close to the base layer in the underlayer.

3. The magnetic recording medium according to claim 1, wherein a total thickness of the magnetic layer and the underlayer is 1000 nm or less.

4. The magnetic recording medium according to claim 1, wherein the magnetic layer has a thickness of 80 nm or less.

5. The magnetic recording medium according to claim 1, wherein the underlayer contains a non-magnetic powder.

6. The magnetic recording medium according to claim 1, wherein the underlayer contains a lubricant.

7. The magnetic recording medium according to claim 1, having an average thickness tr of 5.5 μm or less.

8. The magnetic recording medium according to claim 1, wherein the magnetic layer contains a magnetic powder.

9. The magnetic recording medium according to claim 8, wherein the magnetic powder contains hexagonal ferrite, F-iron oxide, or Co-containing spinel ferrite.

10. The magnetic recording medium according to claim 1, wherein the core portion level difference Rk is 5.0 nm or less.

11. The magnetic recording medium according to claim 1, wherein a height of the bearing curve at an area ratio of 10.00% is 2.80 nm or less.

12. A magnetic recording medium comprising:
a magnetic layer; an underlayer; and a base layer in this order, wherein
the underlayer contains a chlorine-containing binder,
in the underlayer, a part having a chlorine count equal to or more than a threshold described below has a thickness of 12% or less of a thickness of the underlayer,
a core portion level difference Rk is 5.5 nm or less and an average thickness of the underlayer is 1100 nm or less in a bearing curve created on a basis of height data of a magnetic layer side surface acquired using an atomic force microscope, and

[the threshold]=[an average chlorine count in the underlayer]+6×[a standard deviation determined in calculation of the average chlorine count].

13. A magnetic recording cartridge comprising the magnetic recording medium according to claim 1, the magnetic recording medium accommodated in a case in a state of being wound around a reel.

14. A magnetic recording cartridge comprising:
the magnetic recording medium according to claim 1;
a communication unit that communicates with a recording and reproducing apparatus;
a storage unit; and
a control unit that
stores information, received from the recording and reproducing apparatus via the communication unit, in the storage unit,
reads the information from the storage unit in response to a request from the recording and reproducing apparatus, and
transmits the information to the recording and reproducing apparatus via the communication unit, wherein
the information includes adjustment information for adjusting a tension applied to the magnetic recording medium in a longitudinal direction.

15. The magnetic recording medium according to claim 1, wherein the base layer contains a polyester-based material or a polyether ether ketone-based material.

* * * * *